United States Patent
Nam et al.

(10) Patent No.: US 10,904,898 B2
(45) Date of Patent: Jan. 26, 2021

(54) MULTI-SLOT SCHEDULING WITH REPETITIVE TRANSMISSION OF A TRANSPORT BLOCK WITH DIFFERENT REDUNDANCY VERSIONS

(71) Applicant: QUALCOMM Incorporated, San Diego, CA (US)

(72) Inventors: Wooseok Nam, San Diego, CA (US); Tao Luo, San Diego, CA (US); Heechoon Lee, San Diego, CA (US); Peter Gaal, San Diego, CA (US); Wanshi Chen, San Diego, CA (US); Joseph Binamira Soriaga, San Diego, CA (US); Peter Pui Lok Ang, San Diego, CA (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 46 days.

(21) Appl. No.: 16/189,175

(22) Filed: Nov. 13, 2018

(65) Prior Publication Data
US 2019/0150164 A1 May 16, 2019

Related U.S. Application Data

(60) Provisional application No. 62/587,316, filed on Nov. 16, 2017.

(51) Int. Cl.
*H04W 72/12* (2009.01)
*H04W 72/04* (2009.01)
(Continued)

(52) U.S. Cl.
CPC ......... *H04W 72/121* (2013.01); *H04L 1/0061* (2013.01); *H04L 1/189* (2013.01);
(Continued)

(58) Field of Classification Search
CPC .. H04L 1/0061; H04L 1/1896; H04W 72/042; H04W 72/0446; H04W 72/121; H04W 72/14
See application file for complete search history.

(56) References Cited

U.S. PATENT DOCUMENTS

2007/0255994 A1* 11/2007 Michel .................. H04L 1/0045
714/751
2014/0098761 A1* 4/2014 Lee ..................... H04W 74/006
370/329
(Continued)

FOREIGN PATENT DOCUMENTS

| EP | 3062457 A1 | 8/2016 |
|---|---|---|
| EP | 3282619 A1 | 2/2018 |
| WO | WO-2016161910 A1 | 10/2016 |

OTHER PUBLICATIONS

LG Electronics: "Discussion on PDSCH Transmission for MTC", 3GPP Draft, R1-155367, Discussion on PDSCH Transmission, 3rd Generation Partnership Project (3GPP), Mobile Competence Centre, 650, Route Des Lucioles, F-06921 Sophia-Antipolis Cedex, France, vol. RAN WG1, No. Malmo, Sweden, Oct. 9, 2015, Oct. 4, 2015 (Oct. 4, 2015), XP051002277, 8 Pages, Retrieved from the Internet: URL:http://www.3gpp.org/ftp/Meetings_3GPP_SYNC/RAN1/Docs/ [retrieved on Oct. 4, 2015].
(Continued)

*Primary Examiner* — Gary Mui
(74) *Attorney, Agent, or Firm* — Holland & Hart LLP

(57) ABSTRACT

Methods, systems, and devices for wireless communications are described. A wireless device may receive downlink control information corresponding to a transmission of a transport block over a plurality of transmission time intervals (TTIs). The wireless device may identify a redundancy version sequence for the transport block. The redundancy version may be a pre-defined sequence or may be configured
(Continued)

by higher layer signaling based on sequence criterion. The wireless device may transmit or receive a plurality of redundancy versions of the transport block in the plurality of TTIs based at least in part on the redundancy version sequence. In some examples, the plurality of redundancy versions may be determined based at least in part on a starting redundancy version identified by another wireless device.

48 Claims, 18 Drawing Sheets

(51) Int. Cl.
  *H04L 1/00*    (2006.01)
  *H04W 72/14*   (2009.01)
  *H04L 1/18*    (2006.01)
(52) U.S. Cl.
  CPC .......... *H04L 1/1812* (2013.01); *H04L 1/1819* (2013.01); *H04L 1/1896* (2013.01); *H04W 72/042* (2013.01); *H04W 72/0446* (2013.01); *H04W 72/14* (2013.01); *H04W 72/1289* (2013.01)

(56) References Cited

U.S. PATENT DOCUMENTS

| | | | |
|---|---|---|---|
| 2016/0211949 A1* | 7/2016 | You | H04W 4/70 |
| 2017/0279472 A1* | 9/2017 | Wong | H04L 5/0044 |
| 2017/0290008 A1* | 10/2017 | Tooher | H04L 1/0007 |
| 2018/0109358 A1* | 4/2018 | Xing | H04L 1/1816 |
| 2018/0368024 A1* | 12/2018 | Cheng | H04L 1/0061 |
| 2018/0375616 A1* | 12/2018 | Beale | H04L 1/1816 |
| 2018/0376498 A1* | 12/2018 | Bhattad | H04W 72/1294 |
| 2019/0075589 A1* | 3/2019 | Jeon | H04L 1/08 |

OTHER PUBLICATIONS

International Search Report and Written Opinion—PCT/US2018/061035—ISA/EPO—dated Mar. 17, 2019.

* cited by examiner

MULTI-SLOT SCHEDULING WITH REPETITIVE TRANSMISSION OF A TRANSPORT BLOCK WITH DIFFERENT REDUNDANCY VERSIONS

CROSS REFERENCES

The present Application for patent claims the benefit of U.S. Provisional Patent Application No. 62/587,316 by Nam et al., entitled "MULTI-SLOT SCHEDULING WITH REPETITIVE TRANSMISSION OF A TRANSPORT BLOCK WITH DIFFERENT REDUNDANCY VERSIONS," filed Nov. 16, 2017, assigned to the assignee hereof, and expressly incorporated herein.

BACKGROUND

The following relates generally to wireless communication, and more specifically to multi-slot scheduling with repetitive transmission of a transport block with different redundancy versions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In order to avoid collisions between transmissions from various wireless devices in a wireless communication system, a base station may control the scheduling of transmissions by the various wireless devices. In the wireless communication system, the base station and a UE may communicate in slots that correspond to certain time and frequency resources of a wireless channel. Each slot may include a number of symbol periods and correspond to a bandwidth. Each slot may include a control channel for transporting control information and a shared data channel for transmitting uplink and/or downlink data. The base station may transmit scheduling grants on the control channel of a slot that allocate some or all of a shared data channel of the slot to a wireless device. The wireless device may transmit or receive data using the shared data channel in accordance with the scheduling grant. In some cases, the scheduling grant may indicate that one or more slots are being aggregated, where two or more slots may be combined to form a longer shared data channel that extends over a longer time period without including an intervening control channel.

Some wireless communications systems may also support error management techniques that enable reliable delivery of digital data over unreliable communication channels. Examples of such error management techniques include forward error correction (FEC) schemes and automatic repeat request (ARQ) schemes, among others. FEC schemes leverage redundant bits to allow receivers to correct errors in a received codeword. ARQ schemes use cyclic redundancy check (CRC) bits appended to a transmission to detect errors. If the observed and expected CRC bits differ, the receiver determines that an error has occurred, discards the transmission, and sends a negative acknowledgement (NACK) to request a re-transmission. Unlike ARQ, Hybrid ARQ (HARQ) techniques do not completely discard transmissions containing errors; rather, the receiver demodulates an incoming transmission and passes soft decisions up to the next stage of the decoding operation. Soft decisions from an original transmission and subsequent re-transmissions may be combined to improve the link efficiency. Existing HARQ schemes, however, do not support HARQ operation when slots are aggregated.

SUMMARY

The described techniques relate to improved methods, systems, devices, or apparatuses that support multi-slot scheduling with repetitive transmission of a transport block with different redundancy versions (RVs). Generally, the described techniques support HARQ operation for aggregated transmission time intervals (TTIs) by indicating a redundancy version sequence for communication of redundancy versions of a transport block within the aggregated TTIs.

In an example, a wireless device, such as a user equipment, may receive downlink control information (DCI) from a second wireless device, such as a base station. The DCI may schedule transmission of a transport block over a set of TTIs, and may indicate a redundancy version sequence for the transport block. In some examples, the DCI may identify an order in which a sequence of RVs is to be transmitted or received. In another example, the base station may signal the RV sequence to the UE, and may transmit DCI that indicates a set of aggregated TTIs and a first RV in the sequence of RVs of a transport block to be transmitted or received within the set of aggregated TTIs. The UE may transmit or receive RVs of the transport block in the set of aggregated TTIs beginning with the first RV indicated in the DCI. In some examples, the base station may select the RV sequence based on a sequence criterion, such as a performance criterion or a self-decodability criterion. The base station and the UE may then transmit or receive a set of redundancy versions of the transport block in the set of aggregated TTIs based at least in part on the redundancy version sequence.

A method of wireless communication is described. The method may include receiving, at a wireless device, downlink control information corresponding to a transmission of a transport block over a set of consecutive transmission time intervals (TTIs), identifying a redundancy version sequence for the transport block, and transmitting or receiving a set of redundancy versions of the transport block in the set of consecutive TTIs based on the redundancy version sequence.

An apparatus for wireless communication is described. The apparatus may include a processor, memory in electronic communication with the processor, and instructions stored in the memory. The instructions may be executable by the processor to cause the apparatus to receive, at a wireless device, downlink control information corresponding to a transmission of a transport block over a set of consecutive transmission time intervals (TTIs), identify a redundancy version sequence for the transport block, and transmit or receiving a set of redundancy versions of the transport block in the set of consecutive TTIs based on the redundancy version sequence.

Another apparatus for wireless communication is described. The apparatus may include means for receiving, at a wireless device, downlink control information corresponding to a transmission of a transport block over a set of consecutive transmission time intervals (TTIs), identifying a redundancy version sequence for the transport block, and transmitting or receiving a set of redundancy versions of the transport block in the set of consecutive TTIs based on the redundancy version sequence.

A non-transitory computer-readable medium storing code for wireless communication is described. The code may include instructions executable by a processor to receive, at a wireless device, downlink control information corresponding to a transmission of a transport block over a set of consecutive transmission time intervals (TTIs), identify a redundancy version sequence for the transport block, and transmit or receiving a set of redundancy versions of the transport block in the set of consecutive TTIs based on the redundancy version sequence.

In some examples of the method, apparatuses, and non-transitory computer-readable medium described herein, the wireless device may be preconfigured with the redundancy version sequence.

Some examples of the method, apparatuses, and non-transitory computer-readable medium described herein may further include operations, features, means, or instructions for processing the downlink control information to identify a starting redundancy version in the redundancy version sequence.

Some examples of the method, apparatuses, and non-transitory computer-readable medium described herein may further include operations, features, means, or instructions for subsequent redundancy versions occurring after the starting redundancy version in the redundancy version sequence may be redundancy version two, redundancy version three, and redundancy version one.

In some examples of the method, apparatuses, and non-transitory computer-readable medium described herein, the downlink control information schedules the transmission of the transport block over the set of consecutive TTIs.

Some examples of the method, apparatuses, and non-transitory computer-readable medium described herein may further include operations, features, means, or instructions for processing the downlink control information to identify an indicator that identifies a starting redundancy version in the redundancy version sequence.

In some examples of the method, apparatuses, and non-transitory computer-readable medium described herein, identifying the redundancy version sequence may include operations, features, means, or instructions for processing signaling that configures the wireless device with the redundancy version sequence based on a sequence criterion.

In some examples of the method, apparatuses, and non-transitory computer-readable medium described herein, the sequence criterion includes a performance criterion.

In some examples of the method, apparatuses, and non-transitory computer-readable medium described herein, the sequence criterion includes a self-decodability criterion.

In some examples of the method, apparatuses, and non-transitory computer-readable medium described herein, the redundancy version sequence includes a first redundancy version and a bit-reversed version of the first redundancy version.

In some examples of the method, apparatuses, and non-transitory computer-readable medium described herein, the redundancy version sequence includes a single redundancy version.

In some examples of the method, apparatuses, and non-transitory computer-readable medium described herein, transmitting or receiving the set of redundancy versions of the transport block in the set of consecutive TTIs may include operations, features, means, or instructions for transmitting or receiving a first redundancy version of the set of redundancy versions and a repetition of the first redundancy version within a first TTI subset of a set of TTI subsets of the set of consecutive TTIs.

Some examples of the method, apparatuses, and non-transitory computer-readable medium described herein may further include operations, features, means, or instructions for determining a size of the first TTI subset, where a number of repetitions of the first redundancy version transmitted or received in the first TTI subset may be based on the determined size.

Some examples of the method, apparatuses, and non-transitory computer-readable medium described herein may further include operations, features, means, or instructions for identifying the set of TTI subsets based on an aggregation level, a code rate, or a combination thereof.

Some examples of the method, apparatuses, and non-transitory computer-readable medium described herein may further include operations, features, means, or instructions for transmitting or receiving a retransmission of the set of redundancy versions of the transport block in a second set of TTIs based on a second redundancy version sequence that differs from the redundancy version sequence.

In some examples of the method, apparatuses, and non-transitory computer-readable medium described herein, transmitting or receiving the set of redundancy versions of the transport block may include operations, features, means, or instructions for transmitting or receiving a first transmission that includes a first subset of the redundancy versions of the transport block corresponding to a first subset of the redundancy version sequence, and transmitting or receiving a second transmission that includes a second subset of the redundancy versions of the transport block corresponding to a second subset of the redundancy version sequence.

A method of wireless communication is described. The method may include transmitting, by a wireless device, downlink control information corresponding to a transmission of a transport block over a set of consecutive transmission time intervals (TTIs), identifying a redundancy version sequence for the transport block, and transmitting or receiving a set of redundancy versions of the transport block in the set of consecutive TTIs based on the redundancy version sequence.

An apparatus for wireless communication is described. The apparatus may include a processor, memory in electronic communication with the processor, and instructions stored in the memory. The instructions may be executable by the processor to cause the apparatus to transmit, by a wireless device, downlink control information corresponding to a transmission of a transport block over a set of consecutive transmission time intervals (TTIs), identify a redundancy version sequence for the transport block, and transmit or receiving a set of redundancy versions of the transport block in the set of consecutive TTIs based on the redundancy version sequence.

Another apparatus for wireless communication is described. The apparatus may include means for transmitting, by a wireless device, downlink control information corresponding to a transmission of a transport block over a set of consecutive transmission time intervals (TTIs), identifying a redundancy version sequence for the transport block, and transmitting or receiving a set of redundancy versions of the transport block in the set of consecutive TTIs based on the redundancy version sequence.

A non-transitory computer-readable medium storing code for wireless communication is described. The code may include instructions executable by a processor to transmit, by a wireless device, downlink control information corresponding to a transmission of a transport block over a set of consecutive transmission time intervals (TTIs), identify a redundancy version sequence for the transport block, and transmit or receiving a set of redundancy versions of the transport block in the set of consecutive TTIs based on the redundancy version sequence.

Some examples of the method, apparatuses, and non-transitory computer-readable medium described herein may further include operations, features, means, or instructions for transmitting an indication of the redundancy version sequence.

In some examples of the method, apparatuses, and non-transitory computer-readable medium described herein, the indication identifies a starting redundancy version in the redundancy version sequence.

In some examples of the method, apparatuses, and non-transitory computer-readable medium described herein, the indication may be in a redundancy version field of the downlink control information, and where the starting redundancy version in the redundancy version sequence may be of a beginning TTI of the set of consecutive TTIs.

Some examples of the method, apparatuses, and non-transitory computer-readable medium described herein may further include operations, features, means, or instructions for subsequent redundancy versions occurring after the starting redundancy version in the redundancy version sequence may be redundancy version two, redundancy version three, and redundancy version one.

In some examples of the method, apparatuses, and non-transitory computer-readable medium described herein, the indication may be transmitted in the downlink control information.

In some examples of the method, apparatuses, and non-transitory computer-readable medium described herein, the indication may be transmitted in radio resource control signaling.

In some examples of the method, apparatuses, and non-transitory computer-readable medium described herein, the downlink control information schedules the transmission of the transport block over the set of consecutive TTIs.

DETAILED DESCRIPTION

Figure 1:
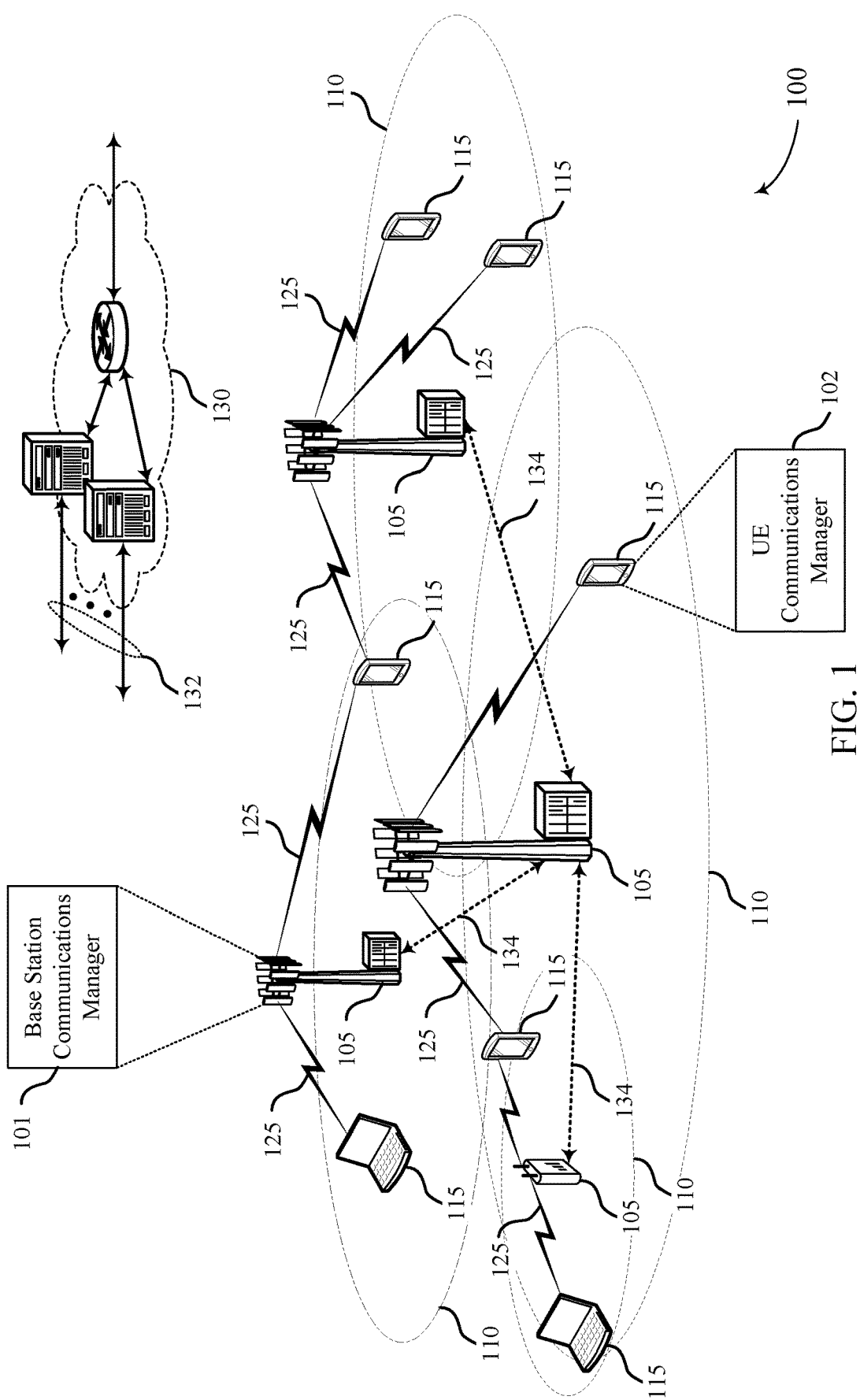
FIG. 1 illustrates an example of a system for wireless communication that supports multi-slot scheduling with repetitive transmission of a transport block with different redundancy versions in accordance with aspects of the present disclosure.

The described techniques support multi-slot scheduling with repetitive transmission of a transport block with different redundancy versions. Generally, the described techniques support HARQ operation for aggregated transmission time intervals (TTIs) by indicating a redundancy version sequence for communication of redundancy versions of a transport block within the aggregated TTIs.

In an example, a first wireless device (e.g., a base station) may transmit downlink control information (DCI) to a second wireless device (e.g., a user equipment (UE)). The DCI may schedule transmission of a transport block over an aggregated set of TTIs. In some examples, the DCI may indicate that the second wireless device is to transmit data to, or receive data from, the first wireless device in the set of TTIs. The second wireless device may receive the DCI and identify a redundancy version sequence for transmitting or receiving the transport block over the set of TTIs. The second wireless device may then transmit or receive redundancy versions of the transport block in the set of TTIs in accordance with the redundancy version sequence. In some examples, the second wireless device may transmit or receive a first redundancy version in accordance with a starting redundancy version identified or otherwise indicated by the first wireless device. Such techniques may be used to enable hybrid automatic repeat request (HARQ) operation for a transport block communicated in a set of aggregated TTIs, such as a set of aggregated slots or aggregated mini-slots.

Slot aggregation techniques may allow a set of TTIs to be allocated to a wireless device in one scheduling grant. The TTIs may be granted for transmission or reception of redundancy versions of a transport block in the aggregated TTIs. In some examples, the techniques described herein may be used to support HARQ operation when multiple redundancy versions of a transport block are communicated in the aggregated TTIs. In order to facilitate HARQ operation with TTI aggregation, the redundancy versions transmitted in a set of TTIs may be determined based on a redundancy version sequence, signaling from another wireless device in the wireless communication system, or a combination thereof.

In an example, a first wireless device (e.g., a base station) may transmit DCI to schedule or activate the transmission of redundancy versions of a transport block in a set of TTIs. The DCI may indicate that a second wireless device (e.g., a user equipment (UE)) is to transmit data to, or receive data from, the first wireless device in the set of TTIs. The first wireless device may also transmit an indication of a redundancy version sequence (e.g., a starting redundancy version) to the second wireless device.

The second wireless device may receive the DCI and identify the TTIs in which it is to transmit or receive redundancy versions of a transport block. A redundancy version of a transport block may refer to a particular combination of information bits and non-information bits (e.g., parity bits), where each different redundancy version may have a different combination of information and non-information bits. The second wireless device may determine which redundancy versions of the transport block to transmit or expect to receive in the set of TTIs based at least in part on a redundancy version sequence.

The redundancy version sequence may be an order in which redundancy versions of a transport block are transmitted. The redundancy version sequence may be locally stored by a UE (e.g., preconfigured with the redundancy version sequence) or may be configured by higher layer signaling based at least in part on a sequence criterion (e.g., a performance criterion and/or a self-decodability criterion). In some examples, the redundancy versions for transmission may be identified based at least in part on signaling from another wireless device in the wireless communication system, e.g., the first wireless device. For example, the second wireless device may receive an identification of a starting redundancy version from the first wireless device. The second wireless device may transmit or receive redundancy versions in accordance with the redundancy version sequence, starting with the identified starting redundancy version.

Aspects of the disclosure are initially described in the context of a wireless communications system. Aspects of the disclosure are further illustrated by and described with reference to apparatus diagrams, system diagrams, and flowcharts that relate to multi-slot scheduling with repetitive transmission of a transport block with different redundancy versions.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be an LTE network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling (e.g., activation) of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

One or more of the base stations 105 may include a base station communications manager 101. The base station communications manager 101 may be configured to transmit DCI to one or more of the UEs 115. The DCI may schedule transmission of a transport block over a set of aggregated TTIs, e.g., the DCI may allocate two or more TTIs (e.g., slots, mini-slots, etc.) that are consecutive in time to a particular UE for communication of a transport block.

The base station communications manager 101 may be further configured to generate an indicator of a redundancy version sequence. The indicator may be a bit sequence, for example. In some examples, the indicator of a redundancy version sequence may identify an order of each RV in the RV sequence, a starting redundancy version in the redundancy version sequence, or the like. The base station communications manager 101 may transmit the indicator of a redundancy version sequence in DCI or in another communication, e.g., radio resource control (RRC) signaling.

One or more of the UEs 115 may include a UE communications manager 102. The UE communications manager 102 may be configured to process DCI received from a base station 105 in a control channel. The UE communications manager 102 may process the DCI to identify a number of aggregated TTIs that have been allocated to the UE 115 for communication of a transport block (TB). The TTIs may be slots, mini-slots, or the like. The UE communications manager 102 may be further configured to receive the indicator of a redundancy version sequence from the base station 105, e.g., as part of the DCI, as part of RRC signaling, or in another communication from the base station 105. In some examples, the indicator of a redundancy version sequence may be an indicator that identifies a starting redundancy version in the redundancy version sequence.

The UE communications manager 102 may be further configured to determine a redundancy version sequence for the transport block. In some examples, the redundancy version sequence may be a defined redundancy version sequence that is locally stored at, or otherwise accessibly by, the UE 115. In some other examples, the redundancy version sequence may be determined (e.g., configured by higher layer signaling from the base station 105) based at least in part on a sequence criterion. In some examples, the sequence criterion may be a performance criterion. In some other examples, the sequence criterion may be a self-decodability criterion. In such examples, the identified redundancy version sequence may include repetitions of the same redundancy version of the transport block (e.g., {0, 3, 0, 3} or {0, 0, 0, 0}) or reversed redundancy versions of the transport block (e.g., {0, 0R, 0, 0R}, where 0R is redundancy version 0 with bit reversal within a modulation symbol.

The UE communications manager 102 may be further configured to transmit or receive a set of redundancy versions of the transport block in the set of TTIs based at least in part on the redundancy version sequence. In some examples, the transmission or reception may be based at least in part on the identified starting redundancy version. In some examples, the transmission or reception may involve a first set of TTIs and a second set of TTIs, which may be a retransmission of the redundancy versions of the transport block. The two sets of TTIs may include the same redundancy versions of the transport block, or may include different redundancy versions of the transport block.

The UE communications manager 102 may be further configured to determine a block size for communicating repetitions of RVs of the transport block. In some examples, the UE communications manager 102 may first determine whether block transmission of redundancy versions is permitted (e.g., whether RV cycling is permitted). Such determination may be based at least in part on an aggregation level, a code rate, or a combination thereof. In some examples, the block transmissions may include blocks of TTIs (e.g., subsets of TTIs within an aggregated set of TTIs), with each block including a number of copies of a redundancy version based at least in part on a block size.

When block transmission of redundancy versions is permitted, the UE communications manager 102 may determine a block size, e.g., a number of redundancy versions that may be included in each block of TTIs. The block size may be determined based at least in part on the number of RVs in the redundancy version sequence and the number of TTIs allocated for transmission of the transport block. If block transmissions are permitted, the UE communications manager 102 determine that a set of aggregated TTIs includes one or more TTI subsets that include a RV of a transport block and a repetition of the RV within the TTI subset.

Figure 2:
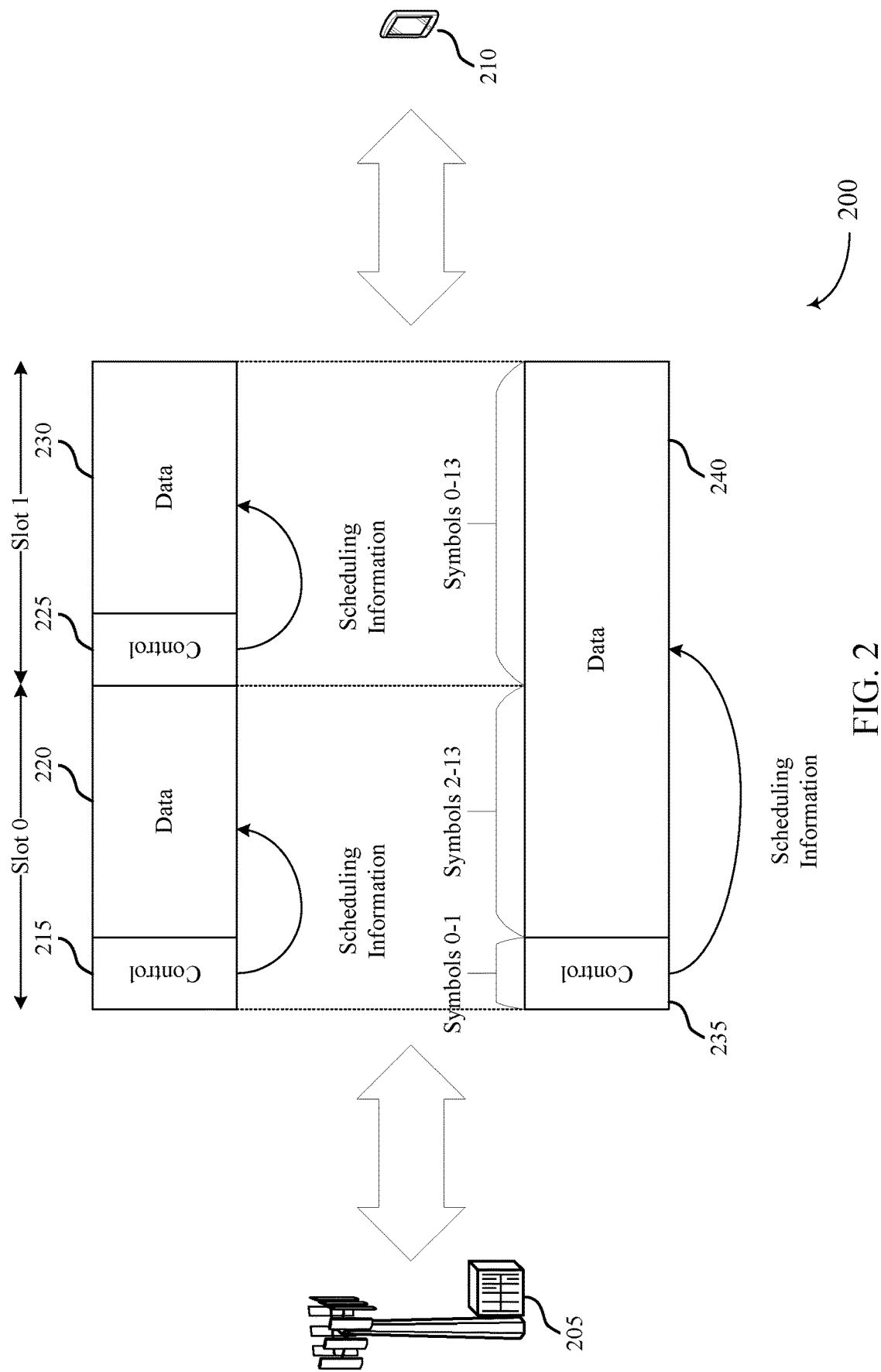
FIG. 2 illustrates an example of a wireless communication system that supports multi-slot scheduling with repetitive transmission of a transport block with different redundancy versions in accordance with aspects of the present disclosure.

FIG. 2 illustrates an example of a wireless communication system 200 that supports multi-slot scheduling with repetitive transmission of a transport block with different redundancy versions in accordance with various aspects of the present disclosure. In some examples, wireless communication system 200 may implement aspects of wireless communications system 100.

Wireless communication system 200 may include a first wireless device 205 and a second wireless device 210. In some examples, the first wireless device 205 may be an example of aspects of base station 105 as described with reference to FIG. 1, and second wireless device 210 may be an example of aspects of UE 115 as described with reference to FIG. 1.

The first wireless device 205 may schedule transmissions in the wireless communication system 200. In particular, the first wireless device 205 may allocate TTIs to other wireless devices in the wireless communication system 200. The TTIs may be, for example, slots, mini-slots, or the like. The first wireless device 205 may allocate two or more consecutive TTIs to a particular wireless device. For example, the first wireless device 205 may allocate at least a first slot (Slot 0) and a second slot (Slot 1) to the second wireless device 210. In some examples, each slot may include 14 symbols.

In some examples, the first wireless device 205 may use single TTI scheduling (e.g., single slot scheduling) to allocate each TTI (e.g., each slot) individually. For example, first wireless device 205 may send a control signal to the second wireless device 210 in a first portion of the TTI, which may be denoted a first control channel 215. The control signal may include a scheduling grant for the first slot. The second wireless device 210 may transmit data in the remainder of the first TTI, which may be denoted a first shared data channel 220. A shared data channel may be, for example, a physical downlink shared channel (PDSCH) or a physical uplink shared channel (PUSCH). The first wireless device 205 may then transmit a second control signal to the second wireless device 210 in a second control channel 225. The control signal may include a scheduling grant for the second slot. The second wireless device 210 may transmit data in the second shared data channel 230.

In some other examples, the first wireless device 205 may use TTI aggregation techniques to allocate two or more consecutive TTIs in a single control transmission. In some examples, the TTI aggregation technique may be a slot aggregation technique, a mini-slot aggregation technique, or the like. For example, the first wireless device 205 may transmit DCI to the second wireless device 210 in the control channel 235. In some examples, the DCI may be transmitted in the first two symbols (symbols 0-1) of a slot having 14 symbols (0-13). The DCI may include a scheduling information (e.g., a scheduling grant or activation indicator) that allocates two or more consecutive TTIs to a second wireless device 210. The allocated set of two or more consecutive TTIs may be referred to herein as a set of aggregated TTIs. For example, the scheduling grant may allocate the remaining symbols of the first slot (e.g., symbols 2-13) and all symbols of the second slot to the second wireless device 210 (e.g., symbols 0-13). The scheduling grant may indicate that the second wireless device 210 is to transmit data to, or receive data from, the first wireless device 205 in the allocated TTIs, e.g., shared data channel 240.

Using TTI aggregation techniques, the first wireless device 205 may schedule a transmission for a single transport block in which a transport block spans multiple TTIs, e.g., multiple slots. In some examples, a single transport block may be limited to a size of a reference case, which may be a slot of fourteen symbols. In some examples, a transport block spanning multiple slots may include repetitions of the transport block. In some examples, the repetition of the transport block may follow a redundancy version sequence.

Accordingly, in some examples, the data transmitted in the aggregated TTIs may include two or more redundancy versions (RVs) of the same transport block. A redundancy version of a transport block may be a combination of information bits and non-information bits, such as parity bits. Each redundancy version of a transport block may include different combinations of information bits and non-information bits. The different combinations of information bits and non-information bits may be used, for example, in chase combining or incremental redundancy HARQ procedures.

For example, in some HARQ schemes (e.g., type II HARQ), transmissions and retransmissions may rotate between various combinations of information bits, error detecting parity bits (e.g., CRC bits), and FEC parity bits. The error detecting parity bits and FEC parity bits may be generated from the information bits (e.g., using a turbo code) based on a mother code rate (MCR). Some communication systems may use a set of different combinations of information bits and parity bits for transmissions and retransmissions in HARQ schemes. These different combinations may be referred to as redundancy versions (RVs). For example, a first RV may contain primarily information (e.g., systematic) bits, while a second RV may contain primarily parity bits. Different RVs (e.g., or different versions of a same RV) may be combined in a process referred to as incremental redundancy (IR) to increase the likelihood of a successful decoding of a transport block.

In some examples, two or more RVs may be transmitted in accordance with a RV sequence (e.g., a sequence of four different RVs may be available for a transport block). For example, the second wireless device 210 may be preconfigured with a RV sequence (e.g., {3, 1, 0, 2}). For example, the RV sequence may be defined by a standard specification and stored at the second wireless device 210. In other examples, the RV sequence may be configured by higher layer signaling based at least in part on a sequence criterion. The sequence criterion may be, for example, a performance criterion or a self-decodability criterion. A performance criterion may be any criterion that relates to the performance of the wireless device.

A self-decodability criterion may be any criterion that relates to the ability of a wireless device to decode the transport block based on the RVs. In some examples, an RV sequence based on a self-decodability criterion may indicate that the same RV is repeated one or more times within the set of aggregated TTIs that form the shared data channel 240, such that the shared data channel 240 may include two or more copies of the same RV. For example, potential RV sequences based on self-decodability criteria may include {0, 2, 3, 2}, {0, 3, 0, 3}, or {0, 0, 0, 0}. In some examples, an RV sequence based on a self-decodability criterion may include a RV and a bit reversal within a modulation symbol of the RV. For example, the RV sequence may be {0, 0R, 0, 0R}, where 0R is RV0 with bit reversal within a modulation symbol.

In some examples, the first wireless device 205 may transmit an indicator of a starting RV to the second wireless device 210. The indicator may be a bit sequence, for example, identifying the starting RV. The indicator of a starting RV may be transmitted in the control channel 235, e.g., as part of the DCI. In some other examples, the indicator of a starting RV may be transmitted in a different communication, e.g., in radio resource control (RRC) signaling. The indicator of a starting RV may be an identification of a starting RV in the RV sequence to indicate an order of the RVs of the RV sequence within the shared data channel 240. The starting RV may indicate that an RV other than the first RV of the RV sequence is being transmitted or received first within the set of aggregated TTIs (e.g., the first RV to be communicated immediately after the control control). In some other examples, the indicator of the starting RV may be a code that corresponds to a starting RV. RVs of the RV sequences may be transmitted or received in the shared data channel 240 starting from the indicated starting RV. For example, if the RV sequence is {3, 1, 0, 2}, and the first wireless device 205 indicates that RV0 is the starting RV, the second wireless device 210 may transmit or receive RV0, followed by RV2, RV3, and RV1 in the shared data channel 240. In another example, if the RV sequence is {3, 1, 0, 2}, and the first wireless device 205 indicates that RV1 is the starting RV, the second wireless device 210 may transmit or receive RV1, followed by RV0, RV2, and RV3 in the shared data channel 240. For comparison, if a starting RV is not indicated in the DCI (or otherwise), RVs may be transmitted or received within the aggregated TTIs in the order provided in the RV sequence (e.g., RV3, followed by RV1, RV0, and RV2).

Figure 3:
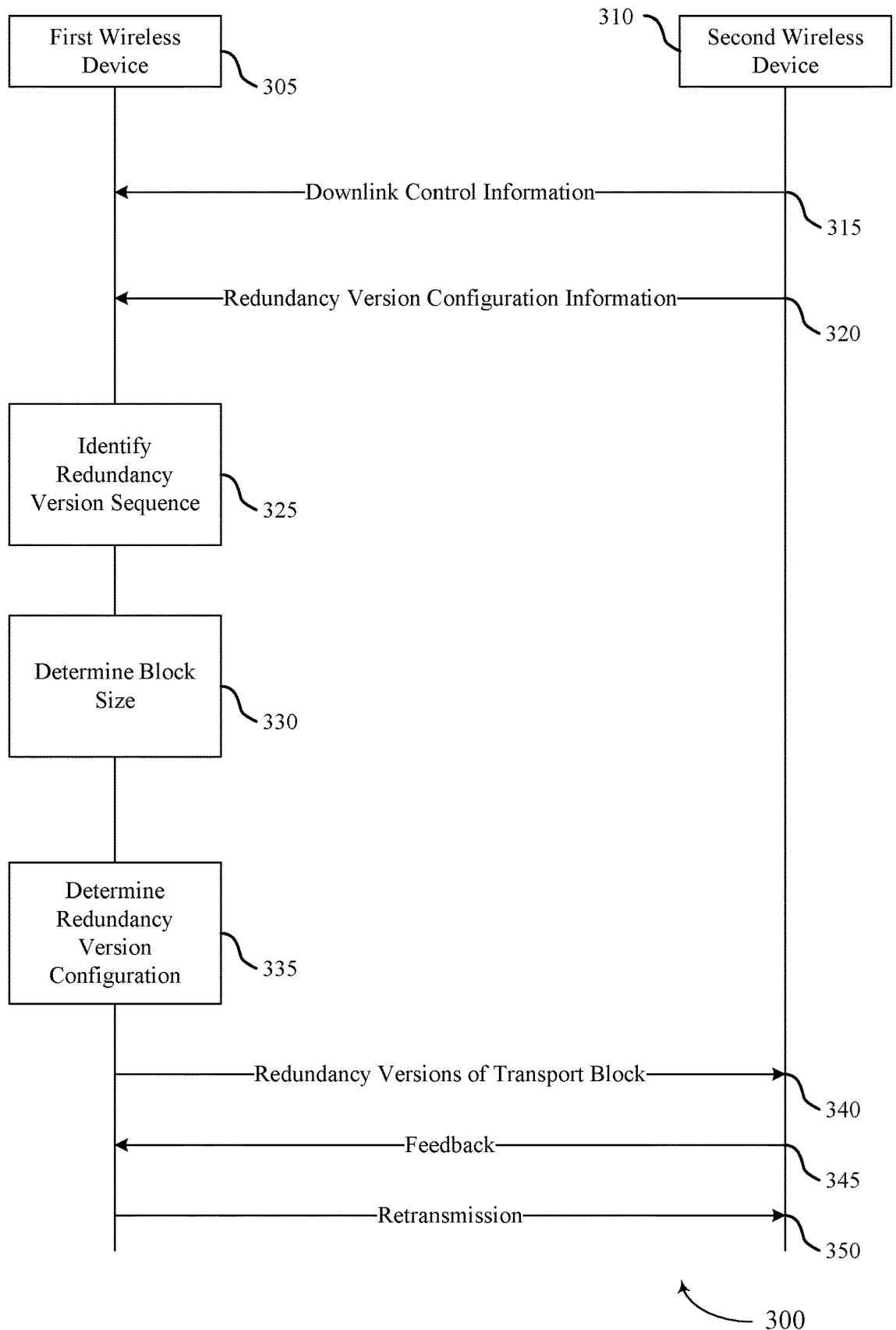
FIG. 3 illustrates an example of a process flow in a wireless communication system that supports multi-slot scheduling with repetitive transmission of a transport block with different redundancy versions in accordance with aspects of the present disclosure.

FIG. 3 illustrates an example of a process flow 300 in a wireless communication system that supports multi-slot scheduling with repetitive transmission of a transport block with different redundancy versions in accordance with various aspects of the present disclosure. In some examples, the process flow 300 may implement aspects of wireless communications system 100.

The process flow 300 illustrates example communications between a first wireless device 305 and a second wireless device 310. The first wireless device 305 may be an example of aspects of UE 115 as described with reference to FIG. 1. The second wireless device 310 may be an example of aspects of base station 105 as described with reference to FIG. 1.

The second wireless device 310 may transmit downlink control information 315 to the first wireless device 305. The downlink control information 315 may include scheduling information for the first wireless device 305. For example, the downlink control information 315 may identify one or more TTIs during which the first wireless device 305 may transmit. In some other examples, the scheduling information may indicate that the first wireless device 305 is to receive data during the aggregated TTIs. The TTIs may be, for example, one or more slots, one or more mini-slots, or the like.

The second wireless device 310 may also transmit redundancy version (RV) configuration information 320 to the first wireless device. The RV configuration information 320 may include, for example, an indicator of a redundancy version sequence, an indicator of a starting RV in the redundancy version sequence, or the like. For example, the first wireless device 305 may store a set of RV sequences, and the indicator of a redundancy version sequence may include an index (e.g., a bit sequence) that indicates which RV sequence of the set of RV sequences to use. In another example, the RV configuration information 320 may identify RV0 as the starting RV in a RV sequence that lists RVs in the following order {RV3, RV0, RV2, RV1}. In some other examples, the second wireless device 310 may apply a sequence criterion to select the RV sequence. In some examples, the RV configuration information 320 may be transmitted as part of the DCI 315 (e.g., in a RV field of the DCI 315). In some other examples, the RV configuration information 320 may be transmitted separately from the DCI 315, e.g., as part of radio resource control (RRC) signaling.

The first wireless device 305 may process the indicator to identify a redundancy version sequence at 325. The redundancy version sequence may be defined (e.g., in a specification set forth by a standard-setting organization) or otherwise stored at the first wireless device. For example, the RV sequence may be defined as {0, 2, 3, 1}. In some other examples, the second wireless device 310 may apply a sequence criterion to determine the RV sequence. The RV sequence may be configured by higher layer signaling.

The sequence criterion may be, for example, a performance criterion or a self-decodability criterion. In one example, the RV sequence based on a performance criterion may be {0, 2, 3, 1}. In another example, the RV sequence based on a self-decodability criterion may be {0, 3, 2, 1}. In some examples, an RV sequence based on a self-decodability criterion may include repetition of the same RV. For example, potential RV sequences based on self-decodability criteria may include {0, 2, 3, 2}, {0, 3, 0, 3}, or {0, 0, 0, 0}. In some examples, an RV sequence based on a self-decodability criterion may include a RV and a bit reversal within a modulation symbol of the RV. For example, the RV sequence may be {0, 0R, 0, 0R}, where 0R is RV0 with bit reversal within a modulation symbol.

The first wireless device 305 may determine a block size for the transmission at 335. In some examples, the first wireless device 305 may first determine whether block transmission of RVs is permitted (e.g., RV cycling in blocks of slots within a set of aggregated slots allocated to the first wireless device 305). For example, the first wireless device 305 may determine whether block transmissions of RVs is permitted based at least in part on an aggregation level, a code rate, or a combination thereof. Aggregation level may refer to the number of redundancy versions that may be transmitted during the aggregated set of TTIs. For example, when the RV sequence has four entries (e.g., {0, 2, 3, 1}), the first wireless device 305 may determine that block transmission is permitted when the number of TTIs is greater than or equal to eight. Block transmission may refer to communicating a RV and at least one repetition of the RV in a subset of TTIs within the set of aggregated TTIs.

To determine whether block transmission is permitted, the first wireless device 305 may divide the set of aggregated TTIs (e.g., eight TTIs) into two or more TTI subsets, e.g., based at least in part on the number of RVs in the RV sequence. The first wireless device 305 may determine the block size (e.g., a size of the TTI subset) based on the number of redundancy versions that may be transmitted in each of the TTI subsets. For example, when eight TTIs are available for four redundancy versions in the RV sequence, the block size may be 2. Similarly, when 24 TTIs are available for four redundancy versions in the RV sequence order, the block size may be 6.

The first wireless device 305 may determine a redundancy version configuration at 335. The RV configuration may be determined based on one or more of the indicators of starting RV, the RV sequence, the block size, or a combination thereof. For example, the first wireless device 305 may determine that the RV sequence being used within a set of aggregated TTIs is {0, 2, 3, 1}. In this example, a RV field of the DCI may indicate the starting RV for the beginning TTI. In some examples, the number of TTIs in the set of aggregated TTIs may be the same as the number of RVs in the RV sequence. When the indicator of the starting RV identifies RV3 as the starting RV, the first wireless device 305 may configure the RV transmission as transmitting RV3, followed by RV1, RV0, and RV2.

In some other examples, the number of TTIs in the allocated set of TTIs may be less than the number of RVs in the RV sequence. In such examples, the RVs may be transmitted in multiple sets of aggregated TTIs. For example, when an allocated set of TTIs includes two TTIs, the RV sequence includes four RVs, and RV3 is identified as the starting RV, the first wireless device 305 may determine that a first RV transmission transports RV3, RV1 in a first set of aggregated TTIs, and a second RV transmission (e.g., a retransmission) transports RV0, RV2 in a second set of aggregated TTIs.

In some other examples, the number of aggregated TTIs may be greater than the number of RVs in the RV sequence. For example, the number of aggregated TTIs may be twelve. In such examples, when block transmission of RVs is not permitted, the first wireless device 305 may determine that the RV transmission includes the RV sequence of {3, 1, 0, 2} repeats three times (e.g., as 3, 1, 0, 2, 3, 1, 0, 2, 3, 1, 0, 2). When block transmission is permitted, the first wireless device 305 may transmit a block of each redundancy version in accordance with the RV sequence, e.g., a block of RV3, a block of RV1, a block of RV0, and a block of RV2. Each block may include a number of redundancy versions based on the block size, i.e., with a block size of three, the block of RV3 may include three copies of RV3. For example, with a block size of three, the first wireless device 305 may configure the RV transmission as 3, 3, 3, 1, 1, 1, 0, 0, 0, 2, 2, 2.

The first wireless device 305 may then transmit or receive redundancy versions of the transport block 340 based on the determined RV sequence. In the depicted example, the first wireless device 305 may transmit RVs of a transport block to the second wireless device 310. The second wireless device 310 may provide feedback 345 in response to receiving the redundancy versions of the transport block at 340. In some examples, the feedback 345 may be an acknowledgement that the received transport block passed error detection (e.g., using a cyclic redundancy check (CRC)). In some other examples, the feedback 345 may be a negative acknowledgement (NACK) indicating that the received transport block did not pass error detection (e.g., using a cyclic redundancy check (CRC)). In response to a NACK, the first wireless device 305 may send a retransmission 350 of the transport block. In some examples, the retransmission 350 may include the same redundancy versions of the transport block that were transmitted in the original transmission at 340. In some other examples, the retransmission 350 may include one or more redundancy versions of the transport block that differ from the redundancy versions of the transport block sent at 340.

Figure 4:
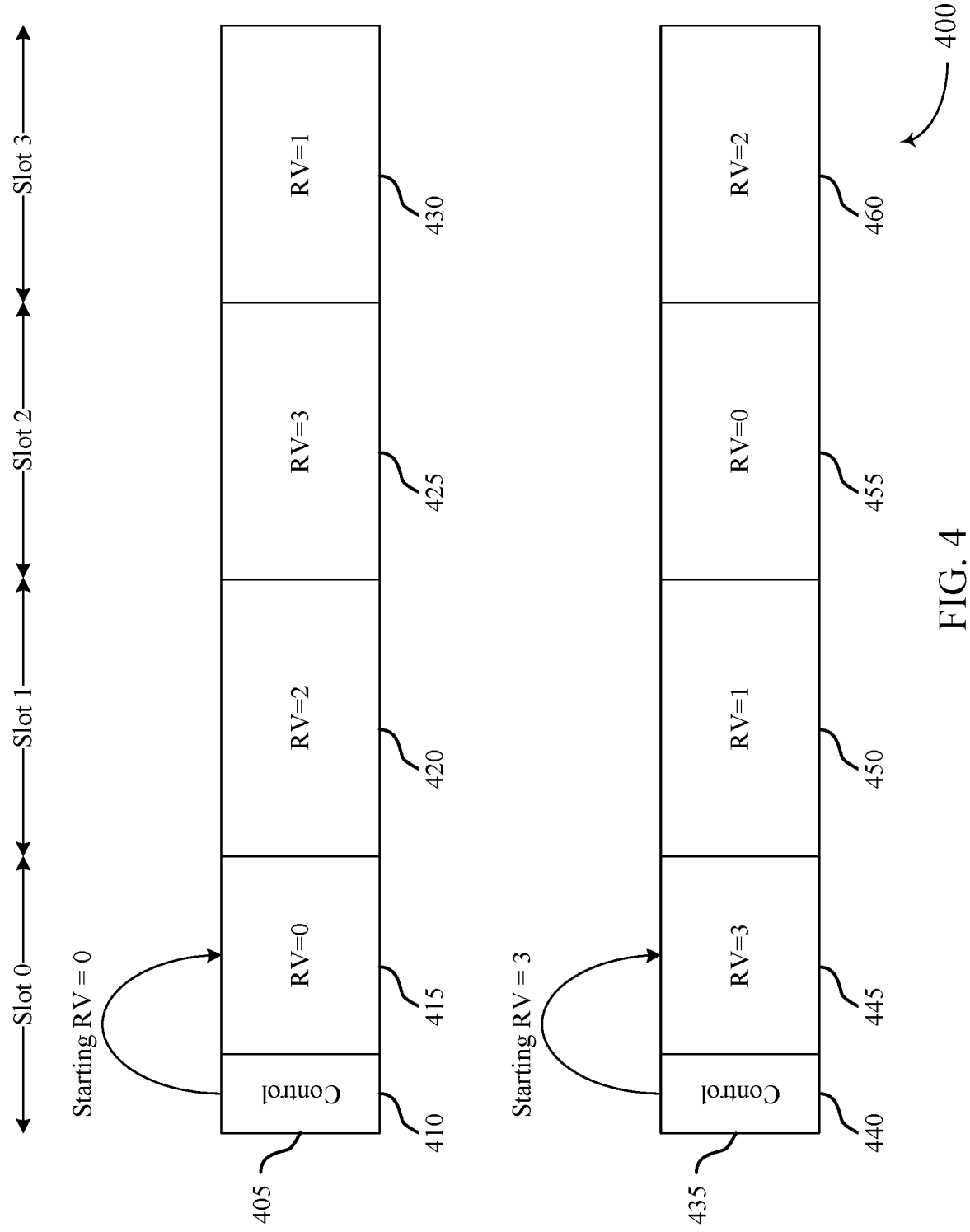
FIG. 4 illustrates an example of a redundancy version transmission scheme in a wireless communication system that supports multi-slot scheduling with repetitive transmission of a transport block with different redundancy versions in accordance with aspects of the present disclosure.

FIG. 4 illustrates an example of a redundancy version transmission scheme 400 in a wireless communication system that supports multi-slot scheduling with repetitive transmission of a transport block with different redundancy versions in accordance with various aspects of the present disclosure. In some examples, the wireless communication system may implement aspects of wireless communications system 100.

The RV transmission scheme 400 may support communication of RVs of a transport block in an initial transmission 405 and in a retransmission 435. The RV transmission scheme 400 may include an initial transmission 405 of a set of RVs of a transport block in an aggregated set of TTIs that includes slots 0-3. A first control channel 410 may include DCI (e.g., scheduling information) indicating that four TTIs are being aggregated and allocated to the second wireless device for communication of the initial transmission 405. The scheduling of the aggregated TTIs in FIG. 4 is represented by an arrow. In some examples, DCI in the first control channel 410 may identify a starting RV, e.g., RV0.

The second wireless device may transmit (or receive) four RVs in the four aggregated TTIs allocated in the scheduling information. The RVs transmitted in the four aggregated TTIs may be determined based on the RV sequence and optionally based on a starting RV. For example, the RV sequence may be {3, 1, 0, 2}, and DCI may indicate that the starting RV in the RV sequence is RV0. The second wireless device may transmit (or receive) RV0 in the first TTI 415, RV2 in second TTI 420, RV3 in the third TTI 425, and RV1 in the fourth TTI 430.

The RV transmission scheme 400 may also include a retransmission 435. The retransmission 435 may occur simultaneous with the initial transmission 405, or may be communicated at a later time in response to feedback indicating that the initial transmission 405 did not pass error detection. In an example, a second control channel 440 may include DCI (e.g., scheduling information) for a retransmission of the RVs of the transport block sent in the initial transmission 405. The second control channel 440 may identify four aggregated TTIs that are allocated for the retransmission 435 (e.g., slots 0-3). In some examples, the scheduling information in the second control channel 440 may identify a starting RV for the retransmission, e.g., RV3, that differs from the starting RV indicated in the initial transmission 405. In some other examples, the retransmission may use the same starting RV as identified in the scheduling information provided in the first control channel 410.

The second wireless device may transmit (or receive) four RVs of the transport block in the retransmission 435 in the aggregated TTIs. The RVs of the transport block communicated in the retransmission 435 may be determined based at least in part on the RV sequence, which may be the same RV sequence used for the initial transmission 405. The RVs transmitted in the four available TTIs may also be determined based at least in part on the starting RV. For example, using the same RV sequence {3, 1, 0, 2}, and a starting RV of RV3, the second wireless device may transmit RV3 in the first retransmission TTI 445, RV1 in the second retransmission TTI 450, RV0 in the third retransmission TTI 455, and RV2 in the fourth retransmission TTI 460.

Figure 5:
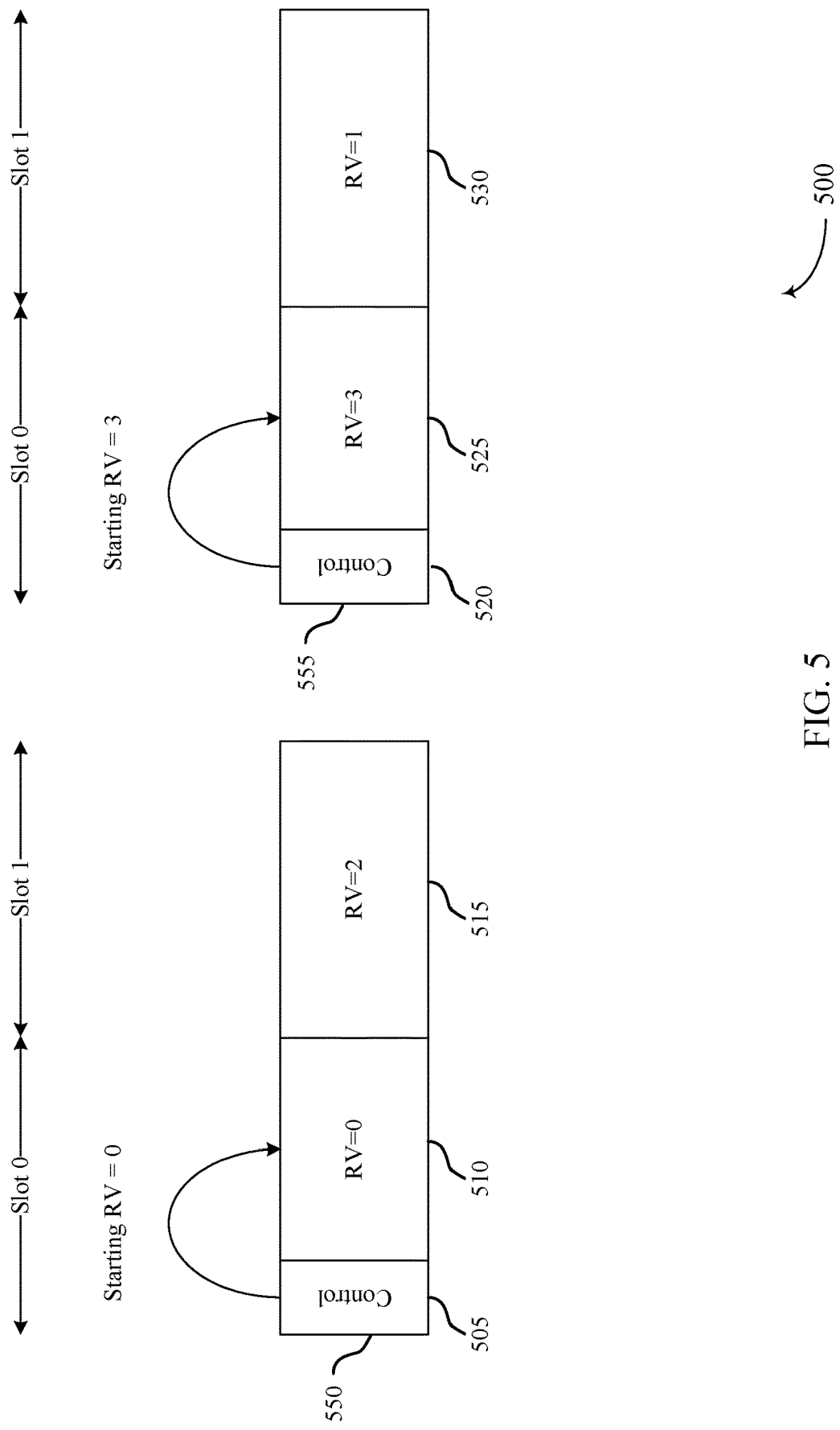
FIG. 5 illustrates an example of a redundancy version transmission scheme in a wireless communication system that supports multi-slot scheduling with repetitive transmission of a transport block with different redundancy versions in accordance with aspects of the present disclosure.

FIG. 5 illustrates an example of a redundancy version transmission scheme 500 in a wireless communication system that supports multi-slot scheduling with repetitive transmission of a transport block with different redundancy versions in accordance with various aspects of the present disclosure. In some examples, the wireless communication system may implement aspects of wireless communications system 100.

The RV transmission scheme 500 may support communication of RVs of a transport block in different transmissions, rather than communicating all of the RVs of the transport block in a same set of aggregated TTIs. In an example, the number of aggregated TTIs may be fewer than the number of RVs, and the RVs may be communicated in different sets of aggregated TTIs. In an example, an RV sequence may include four RVs. A first subset of the RVs of a transport block may be communicated in an initial transmission 550 corresponding to a first set of aggregated TTIs. A second subset of the RVs of the transport block may be communicated in a second transmission 555 corresponding to a second set of aggregated TTIs. The first and second RV subsets may be the same, may partially differ, or may completely differ.

A first control channel 505 of the initial transmission 550 may include scheduling information for a first subset of RVs of a transport block transmitted or received by a second wireless device. The scheduling of the aggregated TTIs in FIG. 5 is represented by an arrow. The scheduling information may identify two TTIs are being aggregated.

The second wireless device may transmit or receive two RVs of the transport block in the two aggregated TTIs for the initial transmission 550. The RVs transmitted in the two aggregated TTIs may be determined based on a RV sequence and a starting RV. For example, the RV sequence may be {3, 1, 0, 2}, and the indicated starting RV may be RV0. The second wireless device may transmit (or receive) RV0 in the first TTI 510 and RV2 in second TTI 515. In some examples, the RVs included in each of the TTIs may vary based on a sequence criterion such as a performance criterion or a self-decodability criterion.

The RV transmission scheme 500 may further include a second transmission 555. A second control channel 520 may allocate additional TTIs to the second wireless device. In some examples, the second transmission 555 may be a retransmission of the initial transmission 550 (e.g., because the first device did not successfully receive or decode the transport block). In some examples, the retransmission 555 may include the same RVs communicated in the initial transmission 550.

In other examples, the retransmission 555 may include transmitting at least one different RV than previously transmitted in the initial transmission 550. For example, the second wireless device may continue transmitting RVs in accordance with the RV sequence. In such an example, the second wireless device may transmit RV3 in the first retransmission TTI 525 and may transmit RV1 in the second retransmission TTI 530.

Figure 6:
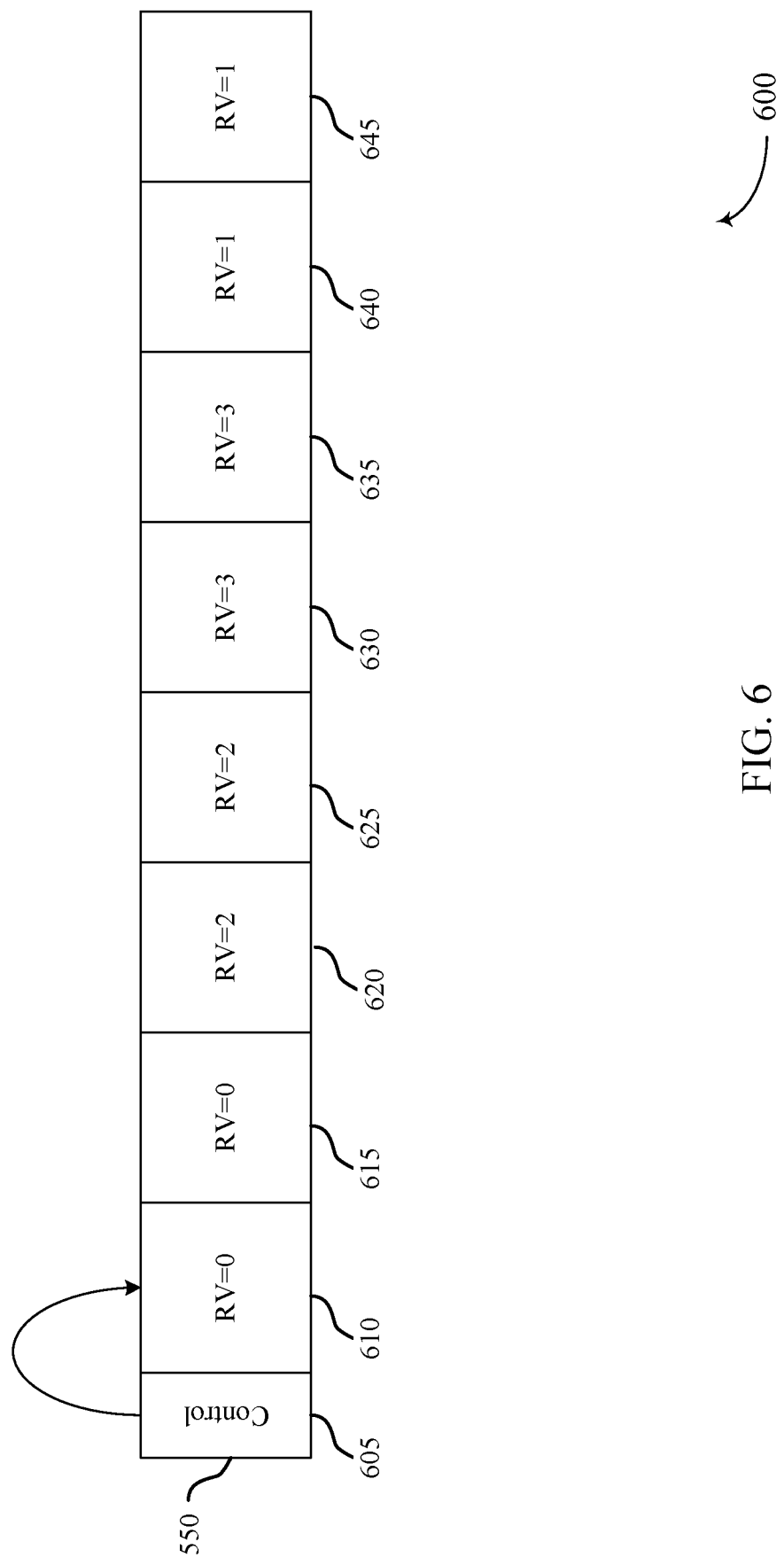
FIG. 6 illustrates an example of a redundancy version transmission scheme in a wireless communication system that supports multi-slot scheduling with repetitive transmission of a transport block with different redundancy versions in accordance with aspects of the present disclosure.

FIG. 6 illustrates an example of a redundancy version transmission scheme 600 in a wireless communication system that supports multi-slot scheduling with repetitive transmission of a transport block with different redundancy versions in accordance with various aspects of the present disclosure. In some examples, the wireless communication system may implement aspects of wireless communications system 100.

The RV transmission scheme 600 may support block-based transmission of RVs in a transmission 650, where each block includes a repetition of at least one RV of a transport block in the transmission 650. In an example, the first control channel 605 may include scheduling information indicating that eight TTIs are being aggregated and allocated to the second wireless device. The scheduling of the aggregated TTIs in FIG. 6 is represented by an arrow.

The second wireless device may transmit (or receive) eight RVs of the transport block in the eight available TTIs. The RVs transmitted in the eight available TTIs may be determined based on a RV sequence and a starting RV. For example, when the RV sequence is {3, 1, 0, 2}, and the starting RV is RV0, the second wireless device may transmit a sequence 3, 1, 0, 2, 3, 1, 0, 2.

In some other examples, the RVs transmitted in the eight aggregated TTIs may be determined based on the RV sequence, the starting RV, and a block size (e.g., when RV cycling is permitted). For example, the defined RV sequence may be {3, 1, 0, 2}, the starting RV may be RV0, and the block size may be 2. In an example, the second wireless device may transmit a first block for RV0, which may include a first copy of RV0 in the first TTI 610 and a second copy of RV0 in the second TTI 615. The second wireless device may then transmit a second block for RV2, which may include a first copy of RV2 in the third TTI 620 and a second copy of RV2 in the fourth TTI 625. The second wireless device may then transmit a third block for RV3, which may include a first copy of RV3 in the fifth TTI 630 and a second copy of RV3 in the sixth TTI 635. The second wireless device may then transmit a fourth block for RV1, which may include a first copy of RV1 in the seventh TTI 640 and a second copy of RV4 in the eighth TTI 645. More generally, the second wireless device may transmit blocks of a number of copies of a particular RV corresponding to the block size in accordance with the RV sequence, e.g., if the block size is five, each block may include five copies of an RV.

Figure 7:
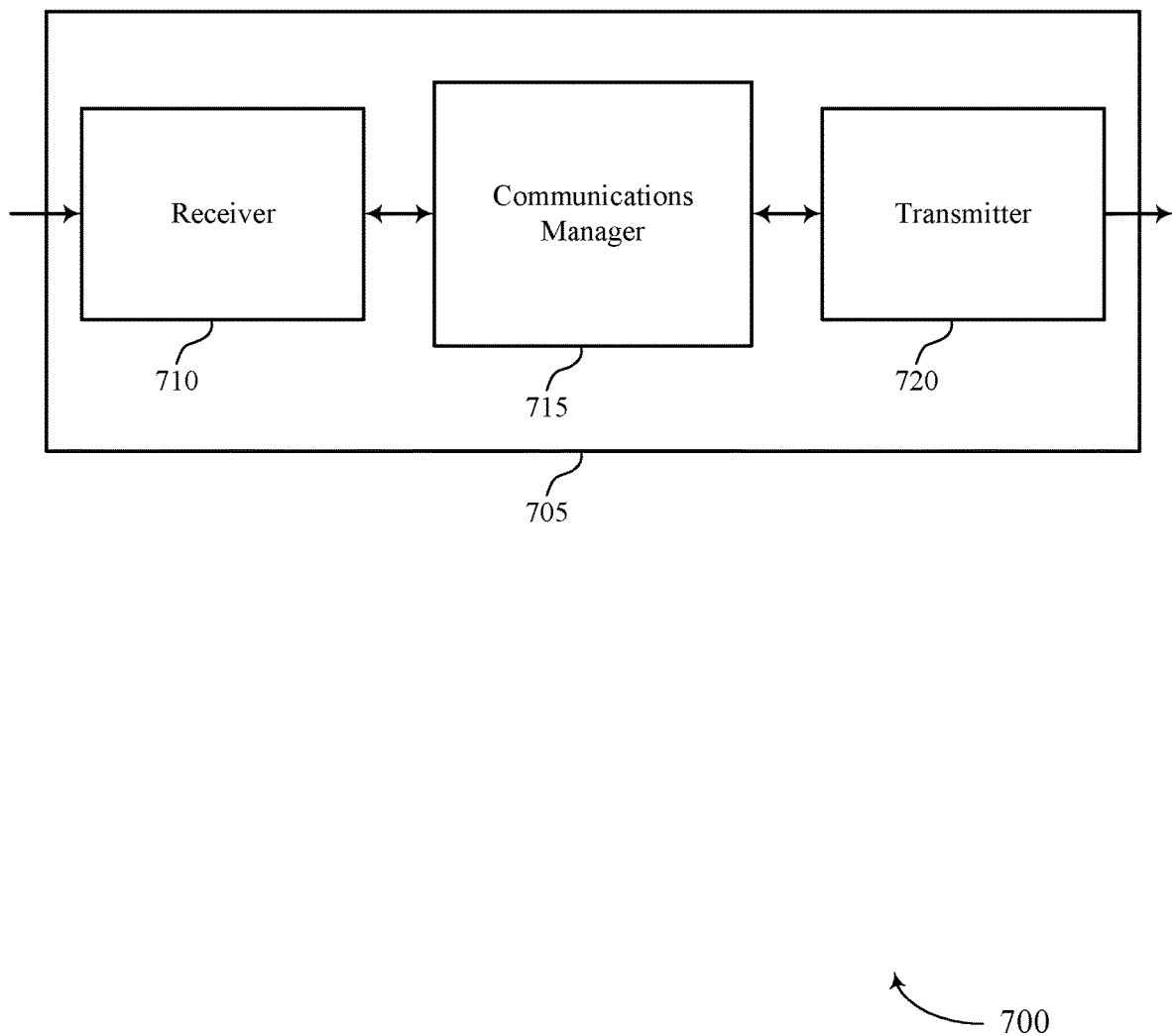
FIGS. 7 through 9 show block diagrams of a device that supports multi-slot scheduling with repetitive transmission of a transport block with different redundancy versions in accordance with aspects of the present disclosure.

FIG. 7 shows a block diagram 700 of a wireless device 705 that supports multi-slot scheduling with repetitive transmission of a transport block with different redundancy versions in accordance with aspects of the present disclosure. Wireless device 705 may be an example of aspects of a user equipment (UE) 115 as described herein. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to multi-slot scheduling with repetitive transmission of a transport block with different redundancy versions, etc.). Information may be passed on to other components of the device. The receiver 710 may be an example of aspects of the transceiver 1035 described with reference to FIG. 10. The receiver 710 may utilize a single antenna or a set of antennas.

UE communications manager 715 may be an example of aspects of the UE communications manager 815 described with reference to FIG. 8 and/or the UE communications manager 102 described with reference to FIG. 1.

UE communications manager 715 and/or at least some of its various sub-components may be implemented in hardware, software executed by a processor, firmware, or any combination thereof. If implemented in software executed by a processor, the functions of the UE communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 715 and/or at least some of its various sub-components may be physically located at various positions, including being distributed such that portions of functions are implemented at different physical locations by one or more physical devices. In some examples, UE communications manager 715 and/or at least some of its various sub-components may be a separate and distinct component in accordance with various aspects of the present disclosure. In other examples, UE communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 715 may receive, at a wireless device, downlink control information corresponding to (e.g., scheduling) a transmission of a transport block over a set of TTIs, identify a redundancy version sequence for the transport block, and transmit or receive a set of redundancy versions of the transport block in the set of TTIs based on the redundancy version sequence.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
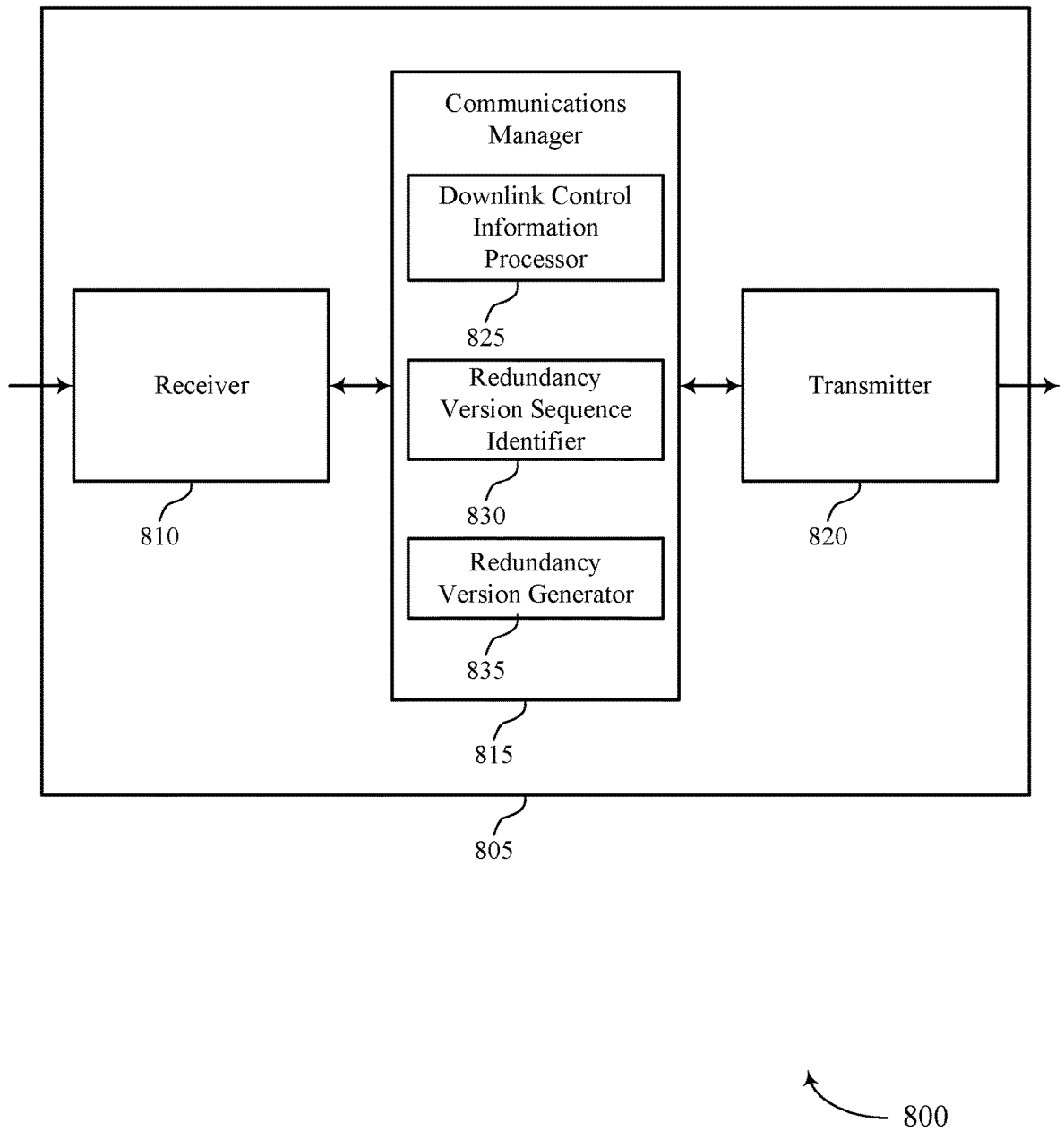

FIG. 8 shows a block diagram 800 of a wireless device 805 that supports multi-slot scheduling with repetitive transmission of a transport block with different redundancy versions in accordance with aspects of the present disclosure. Wireless device 805 may be an example of aspects of a wireless device 705 or a UE 115 as described with reference to FIG. 7. Wireless device 805 may include receiver 810, UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to multi-slot scheduling with repetitive transmission of a transport block with different redundancy versions, etc.). Information may be passed on to other components of the device. The receiver 810 may be an example of aspects of the transceiver 1035 described with reference to FIG. 10. The receiver 810 may utilize a single antenna or a set of antennas.

UE communications manager 815 may be an example of aspects of the UE communications manager 715 described with reference to FIG. 7 and/or the UE communications manager 102 described with reference to FIG. 1.

UE communications manager 815 may also include downlink control information processor 825, redundancy version sequence identifier 830, and redundancy version generator 835.

Downlink control information processor 825 may receive, at a wireless device, downlink control information corresponding to (e.g., scheduling) a transmission of a transport block over a set of TTIs and process the downlink control information to identify an indicator that identifies a starting redundancy version in the redundancy version sequence.

Downlink control information processor 825 may process the downlink control information to identify a redundancy version field that indicates a starting redundancy version in the redundancy version sequence for a beginning TTI of the plurality of TTIs. In some cases, subsequent TTIs after the beginning TTI follow the redundancy version sequence comprising a cycle of zero, two, three, one based on the indicated starting redundancy version Redundancy version sequence identifier 830 may identify a redundancy version sequence for the transport block. In some cases, the wireless device is preconfigured with the redundancy version sequence. In some cases, identifying the redundancy version sequence includes: processing signaling that configures the wireless device with the redundancy version sequence based on a sequence criterion. In some cases, the sequence criterion includes a performance criterion. In some cases, the sequence criterion includes a self-decodability criterion.

Redundancy version generator 835 may transmit or receive a set of redundancy versions of the transport block in the set of TTIs based on the redundancy version sequence, identify the set of TTI subsets based on an aggregation level, a code rate, or a combination thereof, transmit or receive a retransmission of the set of redundancy versions of the transport block in a second set of TTIs based on a second redundancy version sequence that differs from the redundancy version sequence, and transmit or receive a second transmission that includes a second subset of the redundancy versions of the transport block corresponding to a second subset of the redundancy version sequence. In some cases, the redundancy version sequence includes a first redundancy version and a bit-reversed version of the first redundancy version. In some cases, the redundancy version sequence includes a single redundancy version. In some cases, transmitting or receiving the set of redundancy versions of the transport block includes: transmitting or receiving a first transmission that includes a first subset of the redundancy versions of the transport block corresponding to a first subset of the redundancy version sequence.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
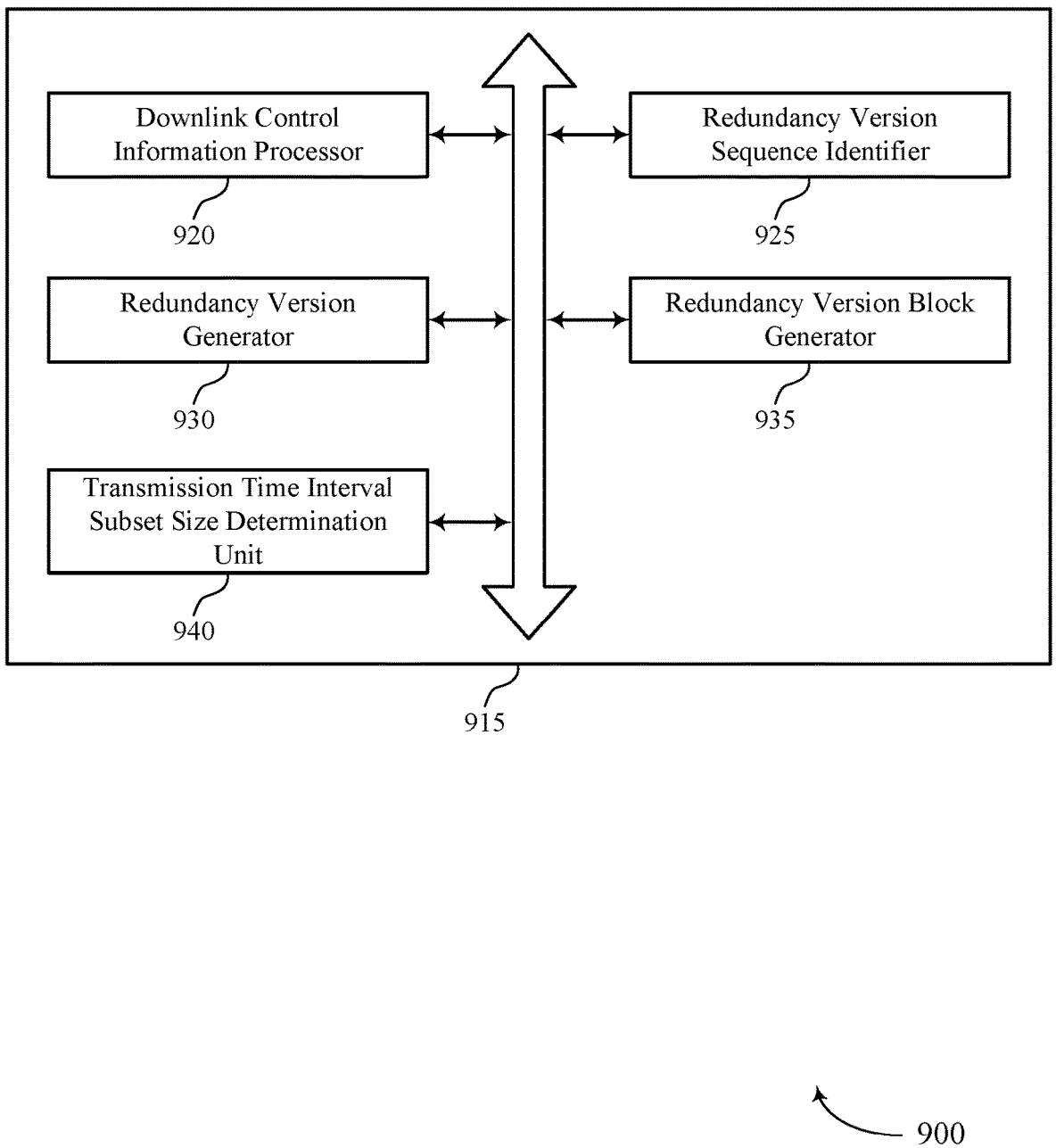

FIG. 9 shows a block diagram 900 of a UE communications manager 915 that supports multi-slot scheduling with repetitive transmission of a transport block with different redundancy versions in accordance with aspects of the present disclosure. The UE communications manager 915 may be an example of aspects of a UE communications manager 102, a UE communications manager 715, or a UE communications manager 815 described with reference to FIGS. 1, 7, and 8. The UE communications manager 915 may include downlink control information processor 920, redundancy version sequence identifier 925, redundancy version generator 930, redundancy version block generator 935, and transmission time interval subset size determination unit 940. Each of these modules may communicate, directly or indirectly, with one another (e.g., via one or more buses).

Downlink control information processor 920 may receive, at a wireless device, downlink control information corresponding to (e.g., scheduling) a transmission of a transport block over a set of TTIs and process the downlink control information to identify an indicator that identifies a starting redundancy version in the redundancy version sequence.

Redundancy version sequence identifier 925 may identify a redundancy version sequence for the transport block. In some cases, the wireless device is preconfigured with the redundancy version sequence. In some cases, identifying the redundancy version sequence includes: processing signaling that configures the wireless device with the redundancy version sequence based on a sequence criterion. In some cases, the sequence criterion includes a performance criterion. In some cases, the sequence criterion includes a self-decodability criterion.

Redundancy version generator 930 may transmit or receive a set of redundancy versions of the transport block in the set of TTIs based on the redundancy version sequence, identify the set of TTI subsets based on an aggregation level, a code rate, or a combination thereof, transmit or receive a retransmission of the set of redundancy versions of the transport block in a second set of TTIs based on a second redundancy version sequence that differs from the redundancy version sequence, and transmit or receive a second transmission that includes a second subset of the redundancy versions of the transport block corresponding to a second subset of the redundancy version sequence. In some cases, the redundancy version sequence includes a first redundancy version and a bit-reversed version of the first redundancy version. In some cases, the redundancy version sequence includes a single redundancy version. In some cases, transmitting or receiving the set of redundancy versions of the transport block includes: transmitting or receiving a first transmission that includes a first subset of the redundancy versions of the transport block corresponding to a first subset of the redundancy version sequence.

Redundancy version block generator 935 may generate redundancy version blocks including two or more redundancy versions. In some cases, transmitting or receiving the set of redundancy versions of the transport block in the set of TTIs includes: transmitting or receiving a first redundancy version of the set of redundancy versions and a repetition of the first redundancy version within a first TTI subset of a set of TTI subsets of the set of TTIs.

Transmission time interval subset size determination unit 940 may determine a size of the first TTI subset, where a number of repetitions of the first redundancy version transmitted or received in the first TTI subset is based on the determined size.

Figure 10:
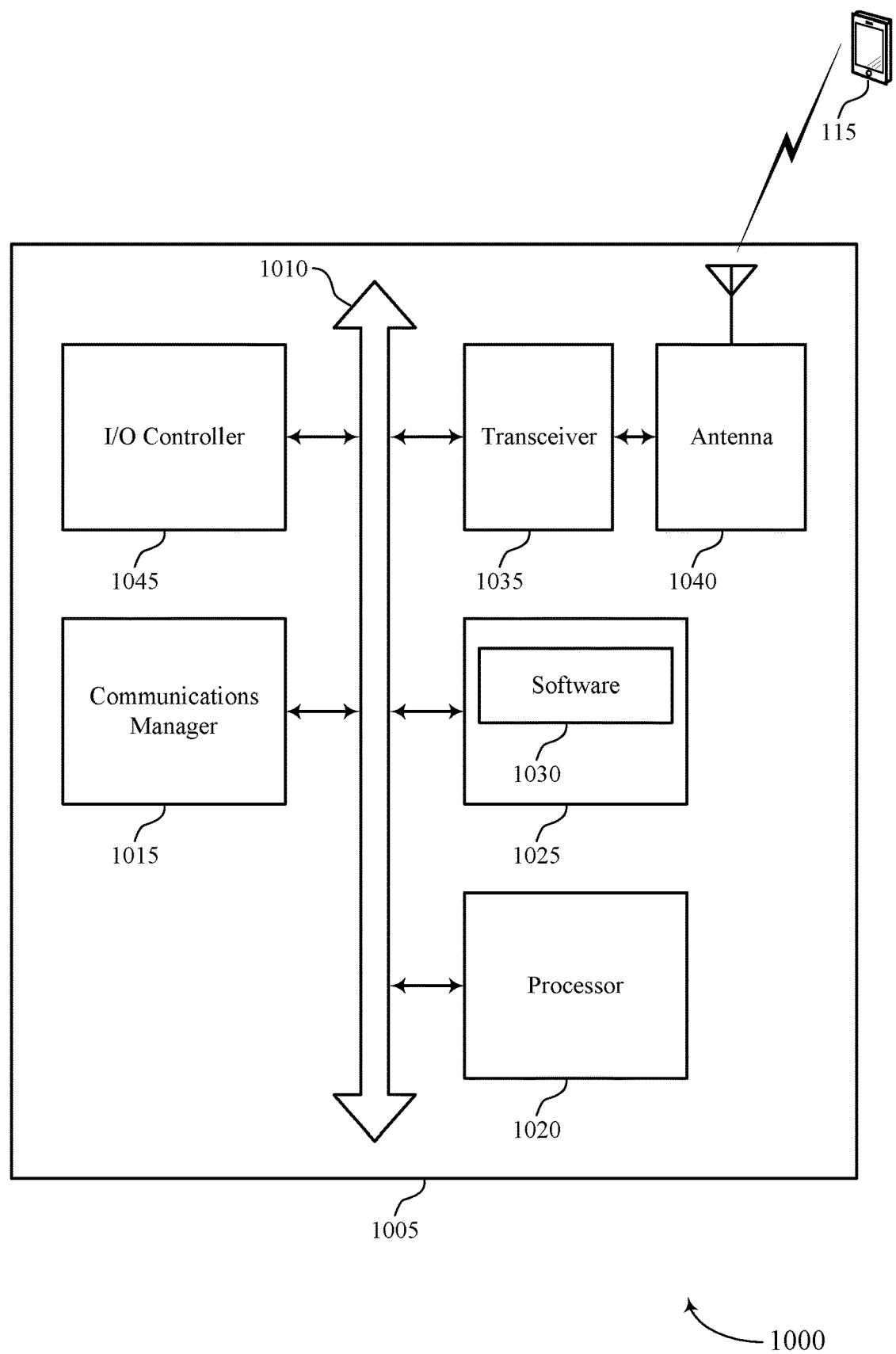
FIG. 10 illustrates a block diagram of a system including a UE that supports multi-slot scheduling with repetitive transmission of a transport block with different redundancy versions in accordance with aspects of the present disclosure.

FIG. 10 shows a diagram of a system 1000 including a device 1005 that supports multi-slot scheduling with repetitive transmission of a transport block with different redundancy versions in accordance with aspects of the present disclosure. Device 1005 may be an example of or include the components of wireless device 705, wireless device 805, or a UE 115 as described herein, e.g., with reference to FIGS. 7 and 8. Device 1005 may include components for bi-directional voice and data communications including components for transmitting and receiving communications, including UE communications manager 1015, processor 1020, memory 1025, software 1030, transceiver 1035, antenna 1040, and I/O controller 1045. These components may be in electronic communication via one or more buses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting multi-slot scheduling with repetitive transmission of a transport block with different redundancy versions).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support multi-slot scheduling with repetitive transmission of a transport block with different redundancy versions. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described herein. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 05. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
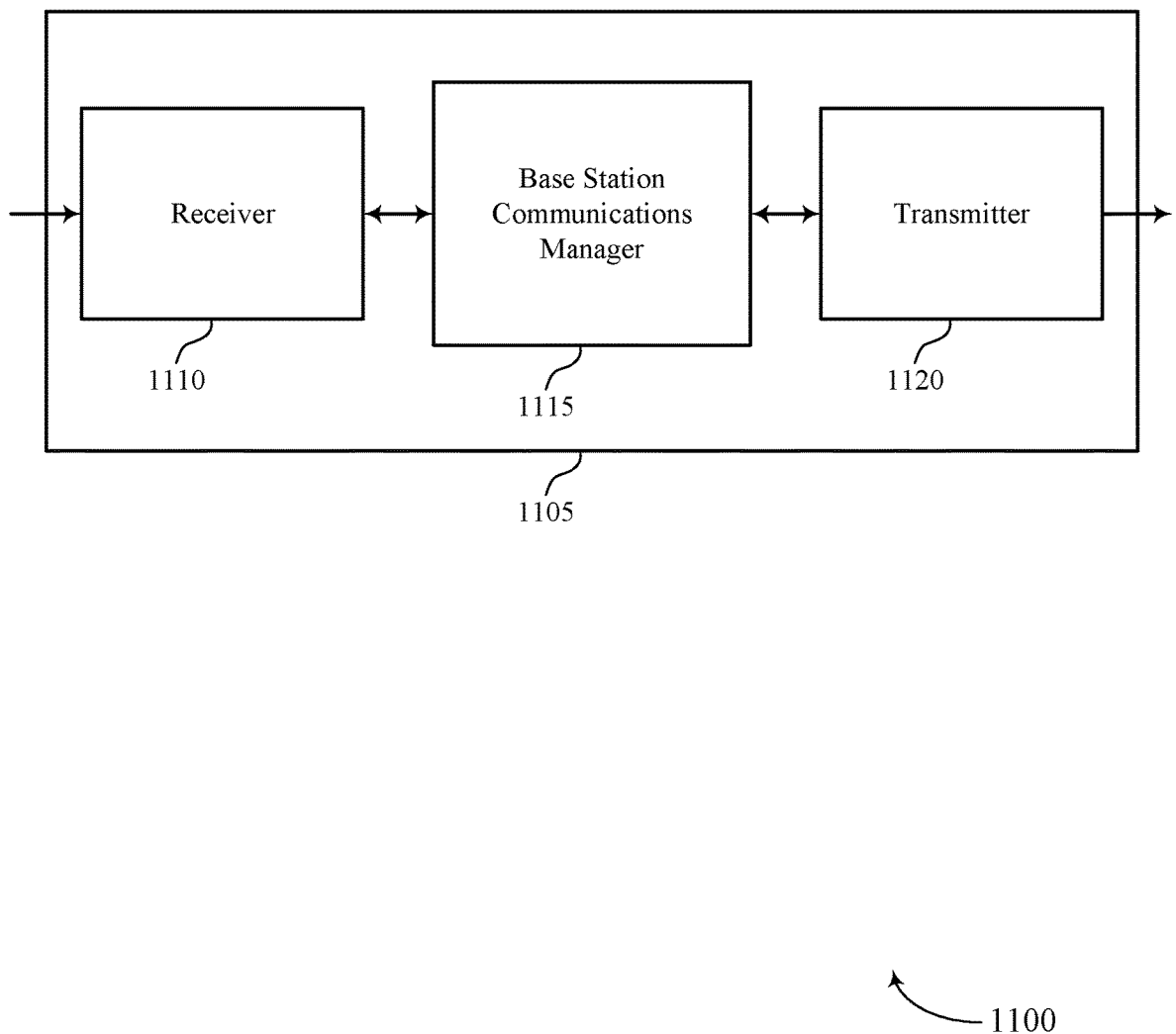
FIGS. 11 through 13 show block diagrams of a device that supports multi-slot scheduling with repetitive transmission of a transport block with different redundancy versions in accordance with aspects of the present disclosure.

FIG. 11 shows a block diagram 1100 of a wireless device 1105 that supports multi-slot scheduling with repetitive transmission of a transport block with different redundancy versions in accordance with aspects of the present disclosure. Wireless device 1105 may be an example of aspects of a base station 105 as described herein. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to multi-slot scheduling with repetitive transmission of a transport block with different redundancy versions, etc.). Information may be passed on to other components of the device. The receiver 1110 may be an example of aspects of the transceiver 1435 described with reference to FIG. 14. The receiver 1110 may utilize a single antenna or a set of antennas.

Base station communications manager 1115 may be an example of aspects of the base station communications manager 1415 described with reference to FIG. 14 and/or base station communications manager 101 described with reference to FIG. 1.

Base station communications manager 1115 and/or at least some of its various sub-components may be implemented in hardware, software executed by a processor, firmware, or any combination thereof. If implemented in software executed by a processor, the functions of the base station communications manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1115 and/or at least some of its various sub-components may be physically located at various positions, including being distributed such that portions of functions are implemented at different physical locations by one or more physical devices. In some examples, base station communications manager 1115 and/or at least some of its various sub-components may be a separate and distinct component in accordance with various aspects of the present disclosure. In other examples, base station communications manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1115 may transmit, by a wireless device, downlink control information corresponding to (e.g., scheduling) a transmission of a transport block over a set of TTIs, identify a redundancy version sequence for the transport block, and transmit or receive a set of redundancy versions of the transport block in the set of TTIs based on the redundancy version sequence.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
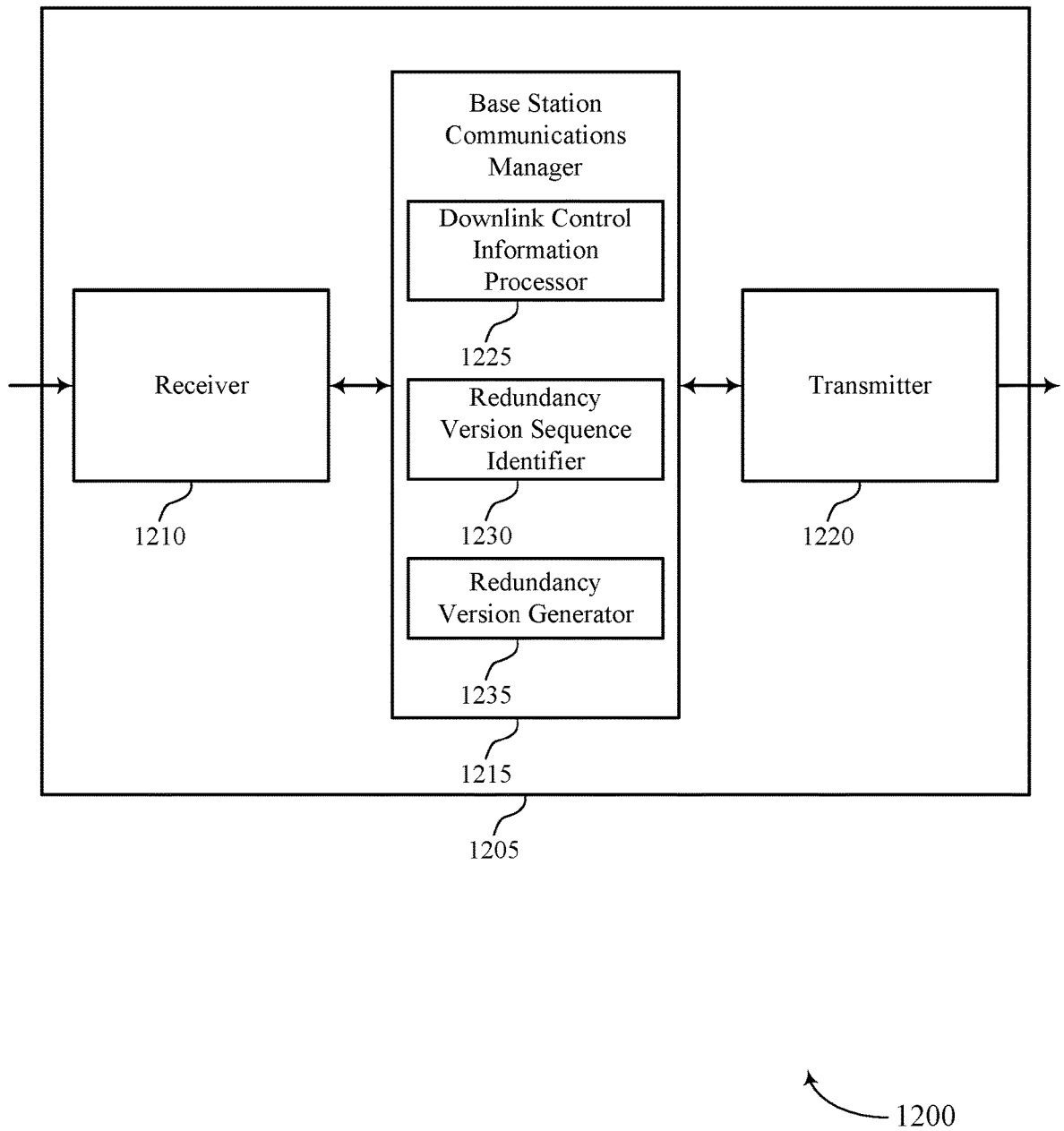

FIG. 12 shows a block diagram 1200 of a wireless device 1205 that supports multi-slot scheduling with repetitive transmission of a transport block with different redundancy versions in accordance with aspects of the present disclosure. Wireless device 1205 may be an example of aspects of a wireless device 1105 or a base station 105 as described with reference to FIG. 11. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to multi-slot scheduling with repetitive transmission of a transport block with different redundancy versions, etc.). Information may be passed on to other components of the device. The receiver 1210 may be an example of aspects of the transceiver 1435 described with reference to FIG. 14. The receiver 1210 may utilize a single antenna or a set of antennas.

Base station communications manager 1215 may be an example of aspects of the base station communications manager 1415 described with reference to FIG. 14 and/or the base station communications manager 101 described with reference to FIG. 1.

Base station communications manager 1215 may also include downlink control information processor 1225, redundancy version sequence identifier 1230, and redundancy version generator 1235.

Downlink control information processor 1225 may transmit, by a wireless device, downlink control information corresponding to (e.g., scheduling) a transmission of a transport block over a set of TTIs.

Redundancy version sequence identifier 1230 may identify a redundancy version sequence for the transport block. In some examples, the indication is in a redundancy version field of the downlink control information, and wherein the starting redundancy version in the redundancy version sequence is of a beginning TTI of the plurality of TTIs. In some cases, the subsequent TTIs after the beginning TTI follow the redundancy version sequence comprising a cycle of zero, two, three, one based at least in part on the indicated starting redundancy version Redundancy version generator 1235 may transmit or receive a set of redundancy versions of the transport block in the set of TTIs based on the redundancy version sequence.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
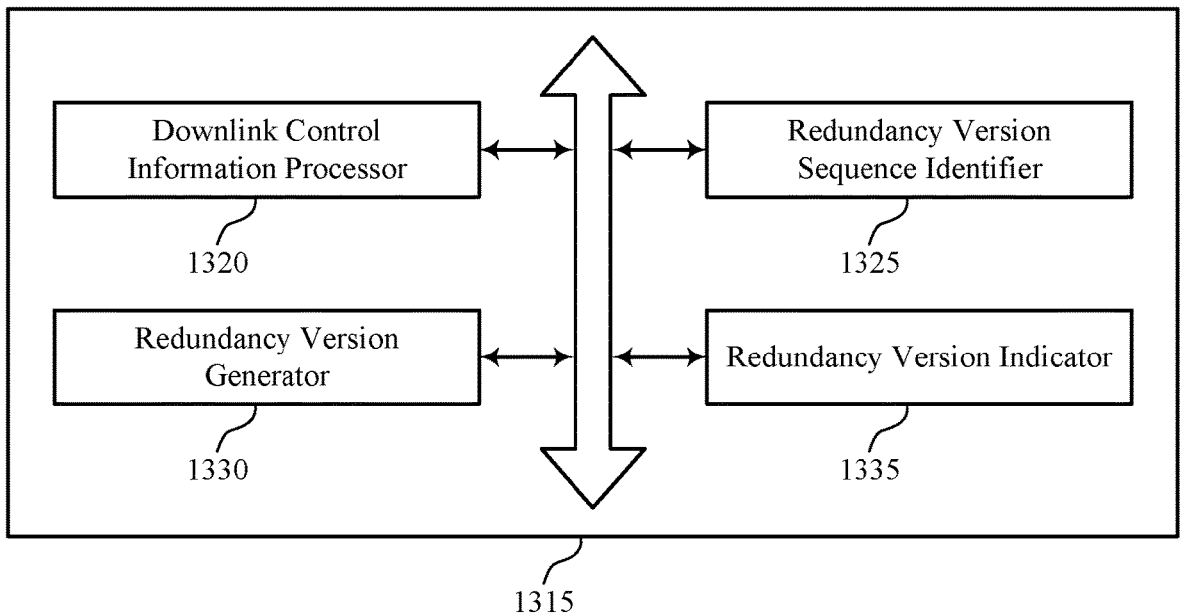

FIG. 13 shows a block diagram 1300 of a base station communications manager 1315 that supports multi-slot scheduling with repetitive transmission of a transport block with different redundancy versions in accordance with aspects of the present disclosure. The base station communications manager 1315 may be an example of aspects of a base station communications manager 1415 described with reference to FIGS. 11, 12, and 14, and/or base station communications manager 101 described with reference to FIG. 1. The base station communications manager 1315 may include downlink control information processor 1320, redundancy version sequence identifier 1325, redundancy version generator 1330, and redundancy version indicator 1335. Each of these modules may communicate, directly or indirectly, with one another (e.g., via one or more buses).

Downlink control information processor 1320 may transmit, by a wireless device, downlink control information corresponding to (e.g., scheduling) a transmission of a transport block over a set of TTIs.

Redundancy version sequence identifier 1325 may identify a redundancy version sequence for the transport block.

Redundancy version generator 1330 may transmit or receive a set of redundancy versions of the transport block in the set of TTIs based on the redundancy version sequence.

Redundancy version indicator 1335 may transmit an indication of the redundancy version sequence. In some cases, the indication identifies a starting redundancy version in the redundancy version sequence. In some cases, the indication is transmitted in the downlink control information. In some cases, the indication is transmitted in radio resource control signaling.

Figure 14:
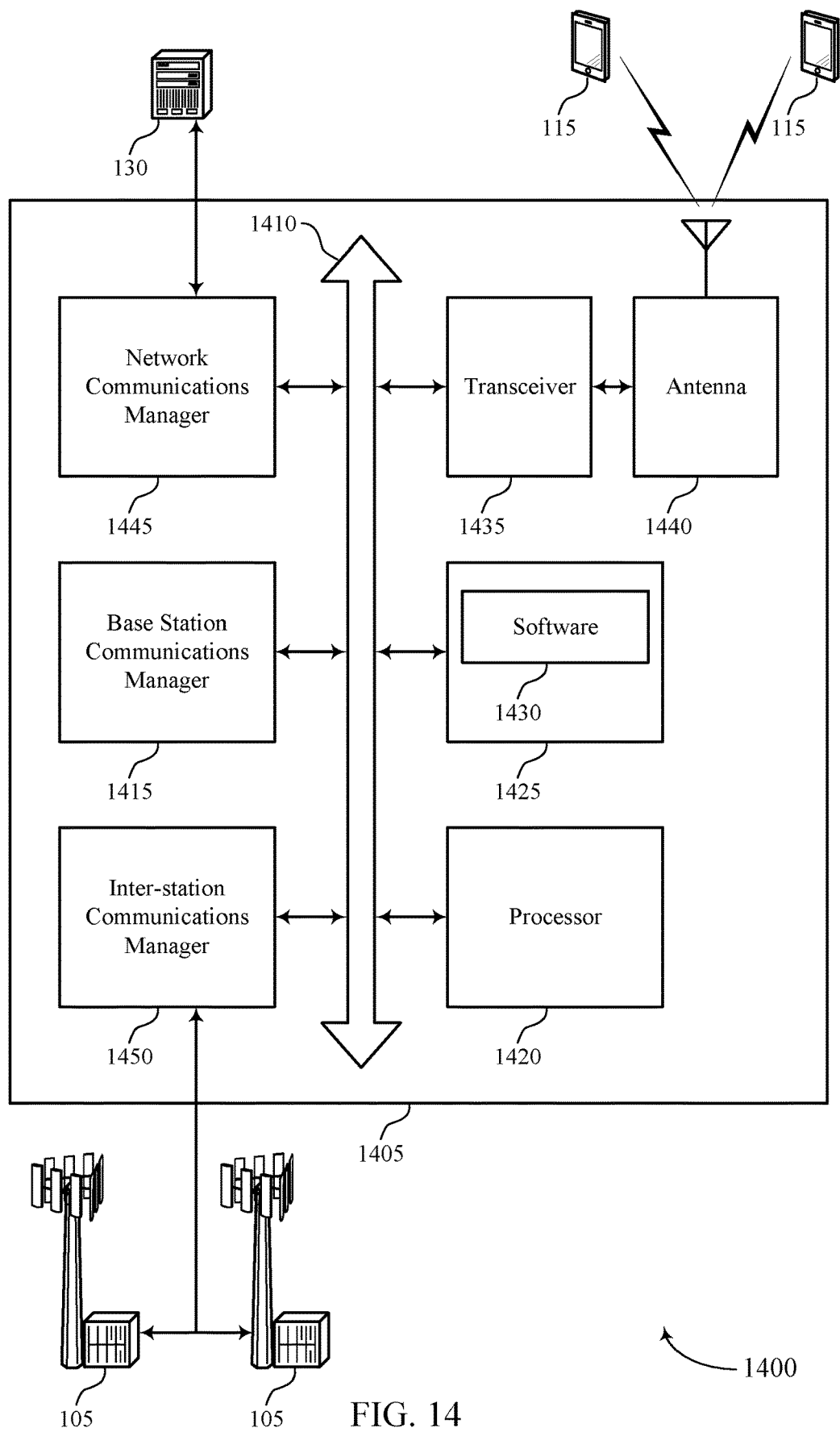
FIG. 14 illustrates a block diagram of a system including a base station that supports multi-slot scheduling with repetitive transmission of a transport block with different redundancy versions in accordance with aspects of the present disclosure.

FIG. 14 shows a diagram of a system 1400 including a device 1405 that supports multi-slot scheduling with repetitive transmission of a transport block with different redundancy versions in accordance with aspects of the present disclosure. Device 1405 may be an example of or include the components of base station 105 as described herein, e.g., with reference to FIG. 1. Device 1405 may include components for bi-directional voice and data communications including components for transmitting and receiving communications, including base station communications manager 1415, processor 1420, memory 1425, software 1430, transceiver 1435, antenna 1440, network communications manager 1445, and inter-station communications manager 1450. These components may be in electronic communication via one or more buses (e.g., bus 1410). Device 1405 may communicate wirelessly with one or more UEs 115.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting multi-slot scheduling with repetitive transmission of a transport block with different redundancy versions).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware or software operation such as the interaction with peripheral components or devices.

Software 1430 may include code to implement aspects of the present disclosure, including code to support multi-slot scheduling with repetitive transmission of a transport block with different redundancy versions. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described herein. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Inter-station communications manager 1450 may manage communications with other base station 105, and may include a controller or scheduler for controlling communications with UEs 115 in cooperation with other base stations 105. For example, the inter-station communications manager 1450 may coordinate scheduling for transmissions to UEs 115 for various interference mitigation techniques such as beamforming or joint transmission. In some examples, inter-station communications manager 1450 may provide an X2 interface within an LTE/LTE-A wireless communication network technology to provide communication between base stations 105.

Figure 15:
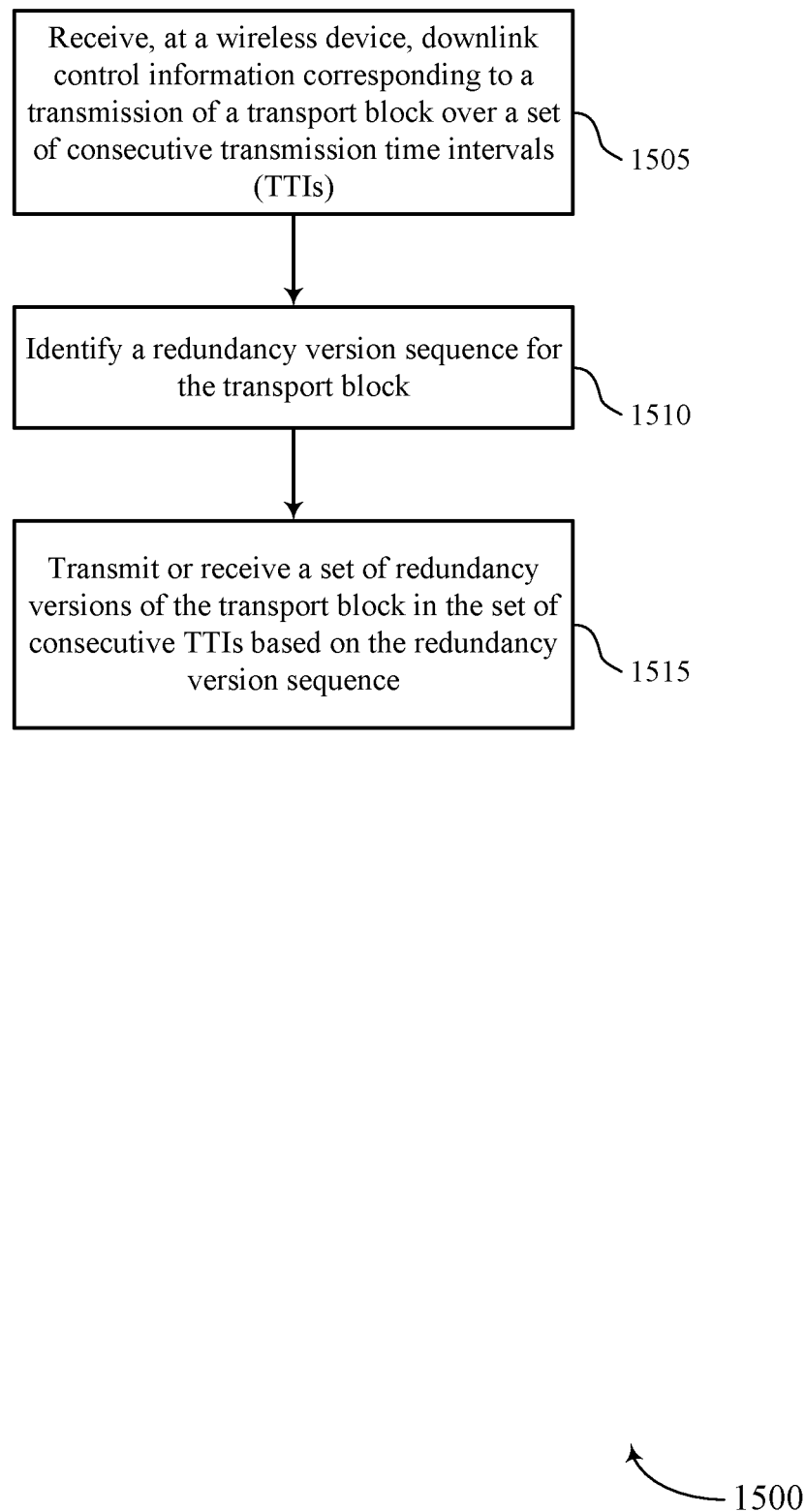
FIGS. 15 through 18 illustrate methods for multi-slot scheduling with repetitive transmission of a transport block with different redundancy versions in accordance with aspects of the present disclosure.

FIG. 15 shows a flowchart illustrating a method 1500 for multi-slot scheduling with repetitive transmission of a transport block with different redundancy versions in accordance with aspects of the present disclosure. The operations of method 1500 may be implemented by a UE 115 or its components as described herein. For example, the operations of method 1500 may be performed by a UE communications manager as described with reference to FIGS. 7 through 10. In some examples, a UE 115 may execute a set of codes to control the functional elements of the device to perform the functions described herein. Additionally or alternatively, the UE 115 may perform aspects of the functions described herein using special-purpose hardware.

At 1505 the UE 115 may receive downlink control information corresponding to (e.g., scheduling) a transmission of a transport block over a plurality of consecutive TTIs. The operations of 1505 may be performed according to the methods described herein. In certain examples, aspects of the operations of 1505 may be performed by a downlink control information processor as described with reference to FIGS. 7 through 10.

At 1510 the UE 115 may identify a redundancy version sequence for the transport block. The operations of 1510 may be performed according to the methods described herein. In certain examples, aspects of the operations of 1510 may be performed by a redundancy version sequence identifier as described with reference to FIGS. 7 through 10.

At 1515 the UE 115 may transmit or receive a plurality of redundancy versions of the transport block in the plurality of consecutive TTIs based at least in part on the redundancy version sequence. The operations of 1515 may be performed according to the methods described herein. In certain examples, aspects of the operations of 1515 may be performed by a redundancy version generator as described with reference to FIGS. 7 through 10.

Figure 16:
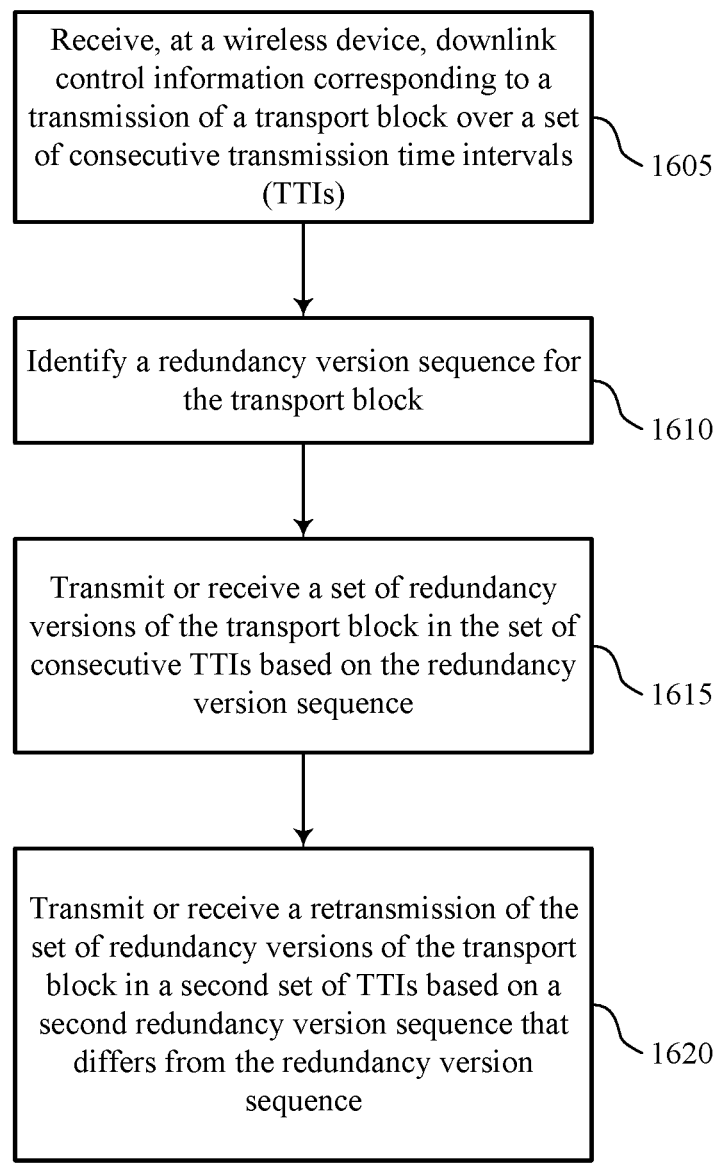

FIG. 16 shows a flowchart illustrating a method 1600 for multi-slot scheduling with repetitive transmission of a transport block with different redundancy versions in accordance with aspects of the present disclosure. The operations of method 1600 may be implemented by a UE 115 or its components as described herein. For example, the operations of method 1600 may be performed by a UE communications manager as described with reference to FIGS. 7 through 10. In some examples, a UE 115 may execute a set of codes to control the functional elements of the device to perform the functions described herein. Additionally or alternatively, the UE 115 may perform aspects of the functions described herein using special-purpose hardware.

At 1605 the UE 115 may receive downlink control information corresponding to (e.g., scheduling) a transmission of a transport block over a plurality of consecutive TTIs. The operations of 1605 may be performed according to the methods described herein. In certain examples, aspects of the operations of 1605 may be performed by a downlink control information processor as described with reference to FIGS. 7 through 10.

At 1610 the UE 115 may identify a redundancy version sequence for the transport block. The operations of 1610 may be performed according to the methods described herein. In certain examples, aspects of the operations of 1610 may be performed by a redundancy version sequence identifier as described with reference to FIGS. 7 through 10.

At 1615 the UE 115 may transmit or receive a plurality of redundancy versions of the transport block in the plurality of consecutive TTIs based at least in part on the redundancy version sequence. The operations of 1615 may be performed according to the methods described herein. In certain examples, aspects of the operations of 1615 may be performed by a redundancy version generator as described with reference to FIGS. 7 through 10.

At 1620 the UE 115 may transmit or receive a retransmission of the plurality of redundancy versions of the transport block in a second plurality of TTIs based at least in part on a second redundancy version sequence that differs from the redundancy version sequence. The operations of 1620 may be performed according to the methods described herein. In certain examples, aspects of the operations of 1620 may be performed by a redundancy version generator as described with reference to FIGS. 7 through 10.

Figure 17:
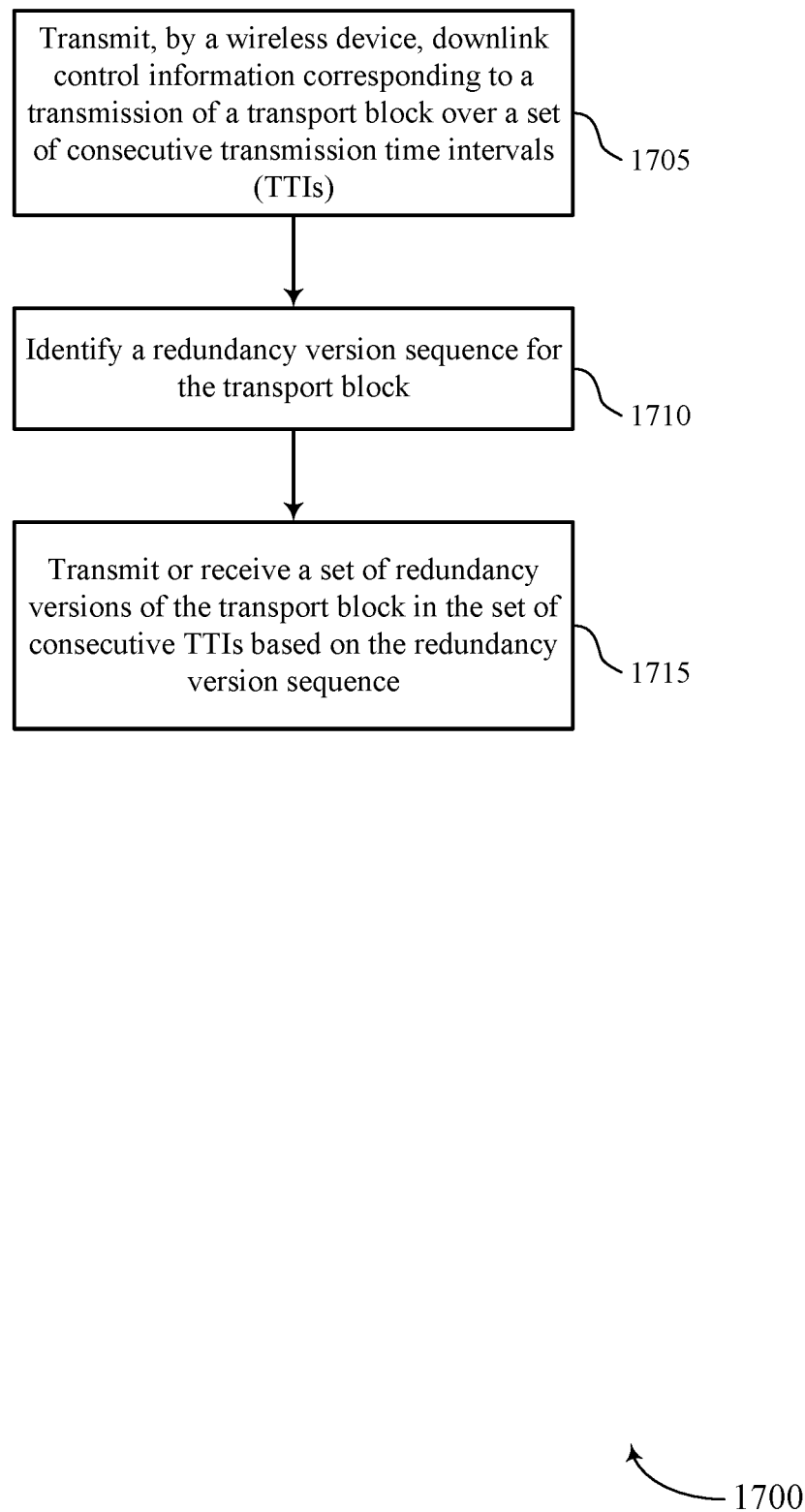

FIG. 17 shows a flowchart illustrating a method 1700 for multi-slot scheduling with repetitive transmission of a transport block with different redundancy versions in accordance with aspects of the present disclosure. The operations of method 1700 may be implemented by a base station 105 or its components as described herein. For example, the operations of method 1700 may be performed by a base station communications manager as described with reference to FIGS. 11 through 14. In some examples, a base station 105 may execute a set of codes to control the functional elements of the device to perform the functions described herein. Additionally or alternatively, the base station 105 may perform aspects of the functions described herein using special-purpose hardware.

At 1705 the base station 105 may transmit downlink control information corresponding to (e.g., scheduling) a transmission of a transport block over a plurality of consecutive TTIs. The operations of 1705 may be performed according to the methods described herein. In certain examples, aspects of the operations of 1705 may be performed by a downlink control information processor as described with reference to FIGS. 11 through 14.

At 1710 the base station 105 may identify a redundancy version sequence for the transport block. The operations of 1710 may be performed according to the methods described herein. In certain examples, aspects of the operations of 1710 may be performed by a redundancy version sequence identifier as described with reference to FIGS. 11 through 14.

At 1715 the base station 105 may transmit or receive a plurality of redundancy versions of the transport block in the plurality of consecutive TTIs based at least in part on the redundancy version sequence. The operations of 1715 may be performed according to the methods described herein. In certain examples, aspects of the operations of 1715 may be performed by a redundancy version generator as described with reference to FIGS. 11 through 14.

Figure 18:
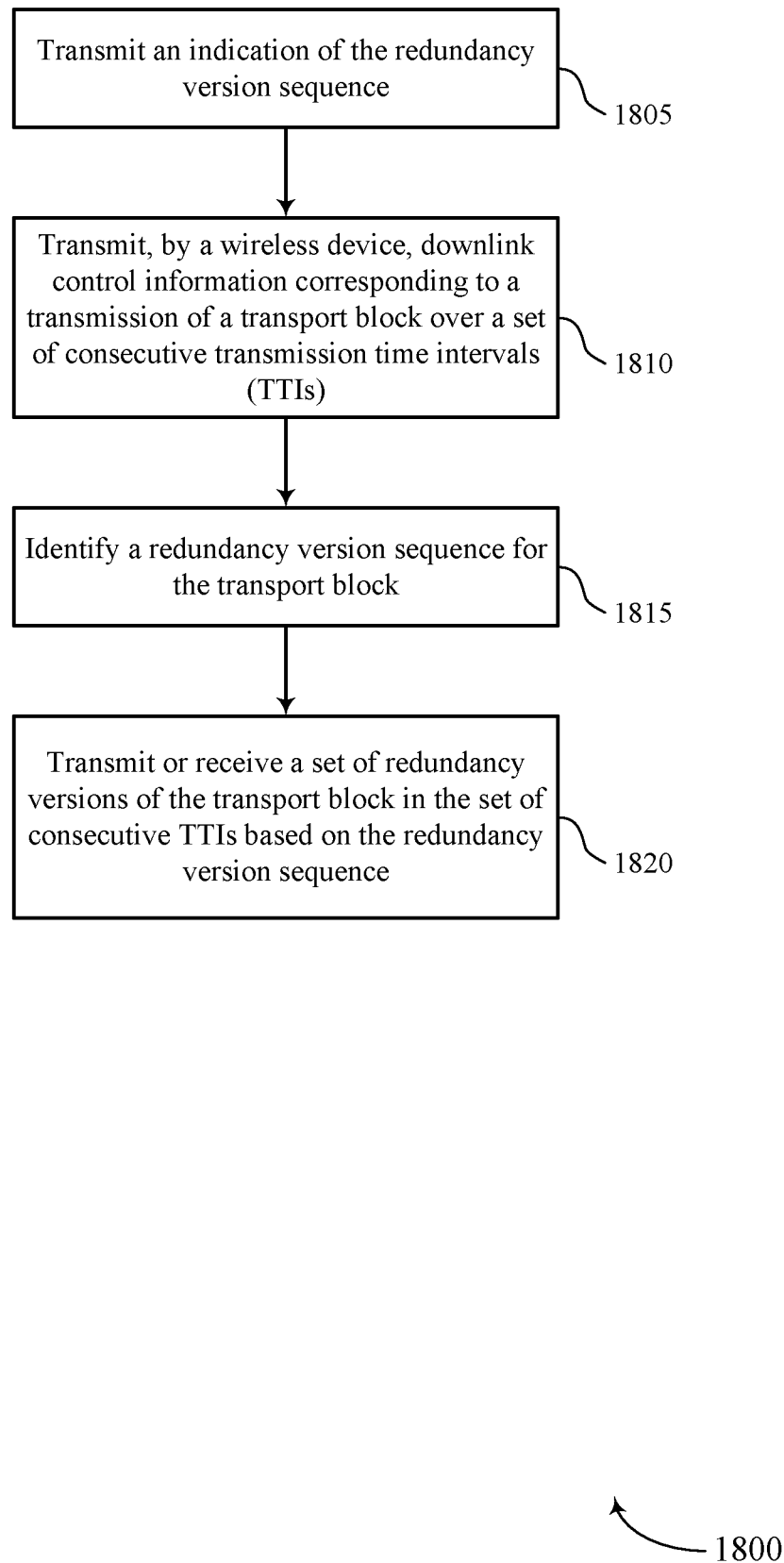

FIG. 18 shows a flowchart illustrating a method 1800 for multi-slot scheduling with repetitive transmission of a transport block with different redundancy versions in accordance with aspects of the present disclosure. The operations of method 1800 may be implemented by a base station 105 or its components as described herein. For example, the operations of method 1800 may be performed by a base station communications manager as described with reference to FIGS. 11 through 14. In some examples, a base station 105 may execute a set of codes to control the functional elements of the device to perform the functions described herein. Additionally or alternatively, the base station 105 may perform aspects of the functions described herein using special-purpose hardware.

At 1805 the base station 105 may transmit an indication of the redundancy version sequence. The operations of 1805 may be performed according to the methods described herein. In certain examples, aspects of the operations of 1805 may be performed by a redundancy version indicator as described with reference to FIGS. 11 through 14.

At 1810 the base station 105 may transmit downlink control information corresponding to (e.g., scheduling) a transmission of a transport block over a plurality of consecutive TTIs. The operations of 1810 may be performed according to the methods described herein. In certain examples, aspects of the operations of 1810 may be performed by a downlink control information processor as described with reference to FIGS. 11 through 14.

At 1815 the base station 105 may identify a redundancy version sequence for the transport block. The operations of 1815 may be performed according to the methods described herein. In certain examples, aspects of the operations of 1815 may be performed by a redundancy version sequence identifier as described with reference to FIGS. 11 through 14.

At 1820 the base station 105 may transmit or receive a plurality of redundancy versions of the transport block in the plurality of consecutive TTIs based at least in part on the redundancy version sequence. The operations of 1820 may be performed according to the methods described herein. In certain examples, aspects of the operations of 1820 may be performed by a redundancy version generator as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving, at a wireless device, downlink control information corresponding to a transmission of a transport block over a plurality of consecutive transmission time intervals (TTIs);
   identifying a redundancy version sequence for the transport block; and
   transmitting or receiving each redundancy version of a plurality of redundancy versions and a repetition of each redundancy version of the plurality of redundancy versions in adjacent TTIs of the plurality of consecutive TTIs based at least in part on the redundancy version sequence.

2. The method of claim 1, wherein the wireless device is preconfigured with the redundancy version sequence.

3. The method of claim 1, further comprising:
   processing the downlink control information to identify a starting redundancy version in the redundancy version sequence.

4. The method of claim 3, wherein subsequent redundancy versions occurring after the starting redundancy version in the redundancy version sequence are redundancy version two, redundancy version three, and redundancy version one.

5. The method of claim 1, wherein the downlink control information schedules the transmission of the transport block over the plurality of consecutive TTIs.

6. The method of claim 1, further comprising:
   processing the downlink control information to identify an indicator that identifies a starting redundancy version in the redundancy version sequence.

7. The method of claim 1, wherein identifying the redundancy version sequence comprises:
   processing signaling that configures the wireless device with the redundancy version sequence based at least in part on a sequence criterion.

8. The method of claim 7, wherein the sequence criterion comprises a performance criterion.

9. The method of claim 7, wherein the sequence criterion comprises a self-decodability criterion.

10. The method of claim 9, wherein the redundancy version sequence comprises a first redundancy version and a bit-reversed version of the first redundancy version.

11. The method of claim 9, wherein the redundancy version sequence comprises a single redundancy version.

12. The method of claim 1, wherein transmitting or receiving each redundancy version of the plurality of redundancy versions and the repetition of each redundancy version of the plurality of redundancy versions in adjacent TTIs of the plurality of consecutive TTIs comprises:
   transmitting or receiving a first redundancy version of the plurality of redundancy versions and a repetition of the first redundancy version within a first TTI subset of a plurality of TTI subsets of the plurality of consecutive TTIs; and
   transmitting or receiving a second redundancy version of the plurality of redundancy versions and a repetition of the second redundancy version within a second TTI subset of the plurality of TTI subsets of the plurality of consecutive TTIs.

13. The method of claim 12, further comprising:
   determining a size of the first TTI subset, wherein a number of repetitions of the first redundancy version transmitted or received in the first TTI subset is based at least in part on the determined size.

14. The method of claim 12, further comprising:
   identifying the plurality of TTI subsets based at least in part on an aggregation level, a code rate, or a combination thereof.

15. The method of claim 1, further comprising:
   transmitting or receiving a retransmission of the plurality of redundancy versions of the transport block in a second plurality of TTIs based at least in part on a second redundancy version sequence that differs from the redundancy version sequence.

16. The method of claim 1, wherein transmitting or receiving each redundancy version of the plurality of redundancy versions and the repetition of each redundancy version of the plurality of redundancy versions in adjacent TTIs comprises:
   transmitting or receiving a first transmission that includes a first subset of the redundancy versions of the transport block corresponding to a first subset of the redundancy version sequence; and
   transmitting or receiving a second transmission that includes a second subset of the redundancy versions of the transport block corresponding to a second subset of the redundancy version sequence.

17. A method for wireless communication, comprising:
   transmitting, by a wireless device, downlink control information corresponding to a transmission of a transport block over a plurality of consecutive transmission time intervals (TTIs);
   identifying a redundancy version sequence for the transport block; and
   transmitting or receiving each redundancy version of a plurality of redundancy versions and a repetition of each redundancy version of the plurality of redundancy versions in adjacent TTIs of in the plurality of consecutive TTIs based at least in part on the redundancy version sequence.

18. The method of claim 17, further comprising: transmitting an indication of the redundancy version sequence.

19. The method of claim 18, wherein the indication identifies a starting redundancy version in the redundancy version sequence.

20. The method of claim 19, wherein the indication is in a redundancy version field of the downlink control information, and wherein the starting redundancy version in the redundancy version sequence is of a beginning TTI of the plurality of consecutive TTIs.

21. The method of claim 20, wherein subsequent redundancy versions occurring after the starting redundancy version in the redundancy version sequence are redundancy version two, redundancy version three, and redundancy version one.

22. The method of claim 18, wherein the indication is transmitted in the downlink control information.

23. The method of claim 17, wherein the downlink control information schedules the transmission of the transport block over the plurality of consecutive TTIs.

24. The method of claim 18, wherein the indication is transmitted in radio resource control signaling.

25. An apparatus for wireless communication, comprising:
a processor;
memory in electronic communication with the processor; and
instructions stored in the memory and executable by the processor to cause the apparatus to:
receive downlink control information corresponding to a transmission of a transport block over a plurality of consecutive transmission time intervals (TTIs);
identify a redundancy version sequence for the transport block; and
transmit or receive each redundancy version of a plurality of redundancy versions and a repetition of each redundancy version of the plurality of redundancy versions in adjacent TTIs of the plurality of consecutive TTIs based at least in part on the redundancy version sequence.

26. The apparatus of claim 25, wherein the apparatus is preconfigured with the redundancy version sequence.

27. The apparatus of claim 25, wherein the instructions are further executable by the processor to cause the apparatus to:
process the downlink control information to identify a starting redundancy version in the redundancy version sequence.

28. The apparatus of claim 27, wherein subsequent redundancy versions occurring after the starting redundancy version in the redundancy version sequence are redundancy version two, redundancy version three, and redundancy version one.

29. The apparatus of claim 25, wherein the downlink control information schedules the transmission of the transport block over the plurality of consecutive TTIs.

30. The apparatus of claim 25, wherein the instructions are further executable by the processor to cause the apparatus to:
process the downlink control information to identify an indicator that identifies a starting redundancy version in the redundancy version sequence.

31. The apparatus of claim 25, wherein the instructions to identify the redundancy version sequence are executable by the processor to cause the apparatus to:
process signaling that configures the apparatus with the redundancy version sequence based at least in part on a sequence criterion.

32. The apparatus of claim 31, wherein the sequence criterion comprises a performance criterion.

33. The apparatus of claim 31, wherein the sequence criterion comprises a self-decodability criterion.

34. The apparatus of claim 33, wherein the redundancy version sequence comprises a first redundancy version and a bit-reversed version of the first redundancy version.

35. The apparatus of claim 33, wherein the redundancy version sequence comprises a single redundancy version.

36. The apparatus of claim 25, wherein the instructions to transmit or receive each redundancy version of the plurality of redundancy versions and the repetition of each redundancy version of the plurality of redundancy versions in adjacent TTIs of the plurality of consecutive TTIs are executable by the processor to cause the apparatus to:
transmit or receive a first redundancy version of the plurality of redundancy versions and a repetition of the first redundancy version within a first TTI subset of a plurality of TTI subsets of the plurality of consecutive TTIs; and
transmit or receive a second redundancy version of the plurality of redundancy versions and a repetition of the second redundancy version within a second TTI subset of the plurality of TTI subsets of the plurality of consecutive TTIs.

37. The apparatus of claim 36, wherein the instructions are further executable by the processor to cause the apparatus to:
determine a size of the first TTI subset, wherein a number of repetitions of the first redundancy version transmitted or received in the first TTI subset is based at least in part on the determined size.

38. The apparatus of claim 36, wherein the instructions are further executable by the processor to cause the apparatus to:
identify the plurality of TTI subsets based at least in part on an aggregation level, a code rate, or a combination thereof.

39. The apparatus of claim 25, wherein the instructions are further executable by the processor to cause the apparatus to:
transmit or receive a retransmission of the plurality of redundancy versions of the transport block in a second plurality of TTIs based at least in part on a second redundancy version sequence that differs from the redundancy version sequence.

40. The apparatus of claim 25, wherein the instructions to transmit or receive each redundancy version of the plurality of redundancy versions and the repetition of each redundancy version of the plurality of redundancy versions in adjacent TTIs of are executable by the processor to cause the apparatus to:
transmit or receive a first transmission that includes a first subset of the redundancy versions of the transport block corresponding to a first subset of the redundancy version sequence; and
transmit or receive a second transmission that includes a second subset of the redundancy versions of the transport block corresponding to a second subset of the redundancy version sequence.

41. An apparatus for wireless communication, comprising:
- a processor;
- memory in electronic communication with the processor; and
- instructions stored in the memory and executable by the processor to cause the apparatus to:
    - transmit downlink control information corresponding to a transmission of a transport block over a plurality of consecutive transmission time intervals (TTIs);
    - identify a redundancy version sequence for the transport block; and
    - transmit or receive each redundancy version of a plurality of redundancy versions and a repetition of each redundancy version of the plurality of redundancy versions in adjacent TTIs of the plurality of consecutive TTIs based at least in part on the redundancy version sequence.

42. The apparatus of claim 41, wherein the instructions are further executable by the processor to cause the apparatus to:
- transmit an indication of the redundancy version sequence.

43. The apparatus of claim 42, wherein the indication identifies a starting redundancy version in the redundancy version sequence.

44. The apparatus of claim 43, wherein the indication is in a redundancy version field of the downlink control information, and wherein the starting redundancy version in the redundancy version sequence is of a beginning TTI of the plurality of consecutive TTIs.

45. The apparatus of claim 44, wherein subsequent redundancy versions occurring after the starting redundancy version in the redundancy version sequence are redundancy version two, redundancy version three, and redundancy version one.

46. The apparatus of claim 42, wherein the indication is transmitted in the downlink control information.

47. The apparatus of claim 42, wherein the indication is transmitted in radio resource control signaling.

48. The apparatus of claim 41, wherein the downlink control information schedules the transmission of the transport block over the plurality of consecutive TTIs.

* * * * *